US010649587B2

(12) United States Patent
Lee et al.

(10) Patent No.: US 10,649,587 B2
(45) Date of Patent: May 12, 2020

(54) TERMINAL, FOR GESTURE RECOGNITION AND OPERATION COMMAND DETERMINATION, VEHICLE HAVING THE SAME AND METHOD FOR CONTROLLING THE SAME

(71) Applicants: HYUNDAI MOTOR COMPANY, Seoul (KR); Korea Advanced Institute of Science and Technology, Guseong-dong, Yuseong-gu (KR)

(72) Inventors: Seung Hwan Lee, Hwaseong-si (KR); Sunjun Kim, Daejeon (KR); Geehyuk Lee, Daejeon (KR); Jaehyun Han, Daejeon (KR); Eunhye Youn, Daejeon (KR)

(73) Assignees: Hyundai Motor Company, Seoul (KR); Korea Advanced Institute of Science and Technology, Daejeon (KR)

( * ) Notice: Subject to any disclaimer, the term of this patent is extended or adjusted under 35 U.S.C. 154(b) by 732 days.

(21) Appl. No.: 14/553,742

(22) Filed: Nov. 25, 2014

(65) Prior Publication Data
US 2015/0261350 A1 Sep. 17, 2015

(30) Foreign Application Priority Data
Mar. 11, 2014 (KR) ........................ 10-2014-0028262

(51) Int. Cl.
*G06F 3/033* (2013.01)
*G06F 3/044* (2006.01)
(Continued)

(52) U.S. Cl.
CPC .............. *G06F 3/044* (2013.01); *B60K 35/00* (2013.01); *B60K 37/06* (2013.01); *G06F 3/017* (2013.01);
(Continued)

(58) Field of Classification Search
CPC ........ G06F 3/044; G06F 3/0488; G06F 3/017; G06F 2203/04108; B60K 2350/1028;
(Continued)

(56) References Cited

U.S. PATENT DOCUMENTS

| 2005/0267676 A1* | 12/2005 | Nezu ...................... B60K 35/00 701/532 |
| 2009/0167719 A1* | 7/2009 | Woolley ................ G06F 1/3203 345/174 |

(Continued)

FOREIGN PATENT DOCUMENTS

| JP | 2009-037434 A | 2/2009 |
| JP | 2012-118991 A | 6/2012 |

(Continued)

OTHER PUBLICATIONS

Korean Office Action issued in corresponding Korean Patent Application No. 10-2014-0028262, dated Apr. 20, 2015; 10 pages with English translation.

*Primary Examiner* — Kieu D Vu
*Assistant Examiner* — Asteway T Gattew
(74) *Attorney, Agent, or Firm* — Morgan, Lewis & Bockius LLP

(57) ABSTRACT

A terminal is provided with an input unit configured to detect contact of an object and a position of the object, and a controller configured to generate a control signal corresponding to a recognition of a gesture of the object, which is detected at a position spaced apart from the input unit when touched by the object. The terminal may allow an operation command desired by the user to be completed since a gesture is initiated at a surface of the terminal, and terminated at the surface of the terminal again after being performed in a space on the surface of the terminal. By specifying a start or an end of the gesture, the intention of the user may be clearly presented and may improve the recognition rate. Therefore, the user may easily manipulate mobile phones and various equipments while driving.

15 Claims, 30 Drawing Sheets

(51) Int. Cl.
*G06F 3/0488* (2013.01)
*G06F 3/01* (2006.01)
*B60K 35/00* (2006.01)
*B60K 37/06* (2006.01)

(52) U.S. Cl.
CPC ...... *G06F 3/0488* (2013.01); *B60K 2370/146* (2019.05); *B60K 2370/1442* (2019.05); *G06F 2203/04108* (2013.01)

(58) Field of Classification Search
CPC ...... B60K 2370/146; B60K 2370/1442; B60K 35/00; B60K 37/06
See application file for complete search history.

(56) References Cited

U.S. PATENT DOCUMENTS

| | | | |
|---|---|---|---|
| 2010/0211920 A1* | 8/2010 | Westerman | G06F 3/04883 715/863 |
| 2012/0050180 A1 | 3/2012 | King et al. | |
| 2013/0063345 A1 | 3/2013 | Maeda | |
| 2013/0106693 A1* | 5/2013 | Okuyama | G06F 3/0482 345/157 |
| 2013/0204459 A1* | 8/2013 | Enami | B60K 37/06 701/1 |
| 2014/0189579 A1* | 7/2014 | Rimon | G06F 3/0485 715/784 |
| 2014/0218315 A1* | 8/2014 | Jeong | G06F 3/04883 345/173 |
| 2014/0267130 A1* | 9/2014 | Hwang | G06F 3/0488 345/174 |

FOREIGN PATENT DOCUMENTS

| | | |
|---|---|---|
| KR | 10-2004-0036593 A | 4/2004 |
| KR | 10-2012-0085392 A | 8/2012 |
| KR | 10-2013-0043229 A | 4/2013 |
| KR | 10-1297144 | 8/2013 |
| KR | 10-2013-0105324 A | 9/2013 |

\* cited by examiner

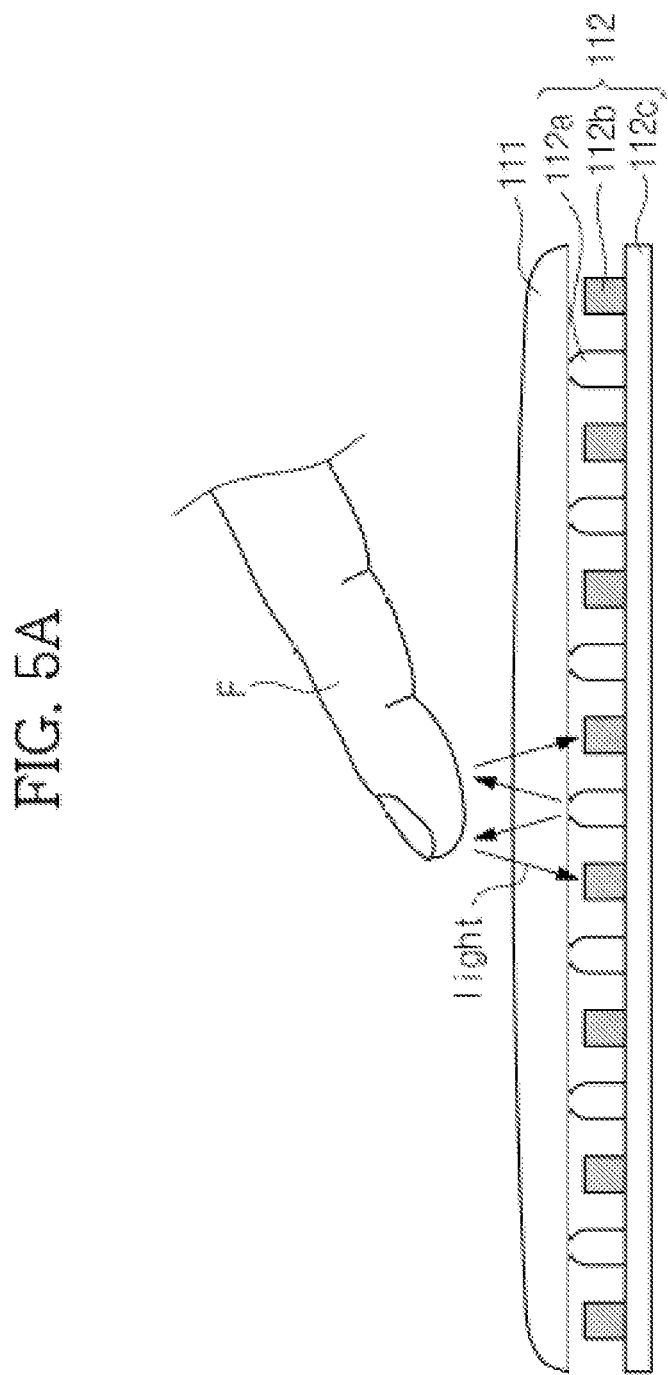

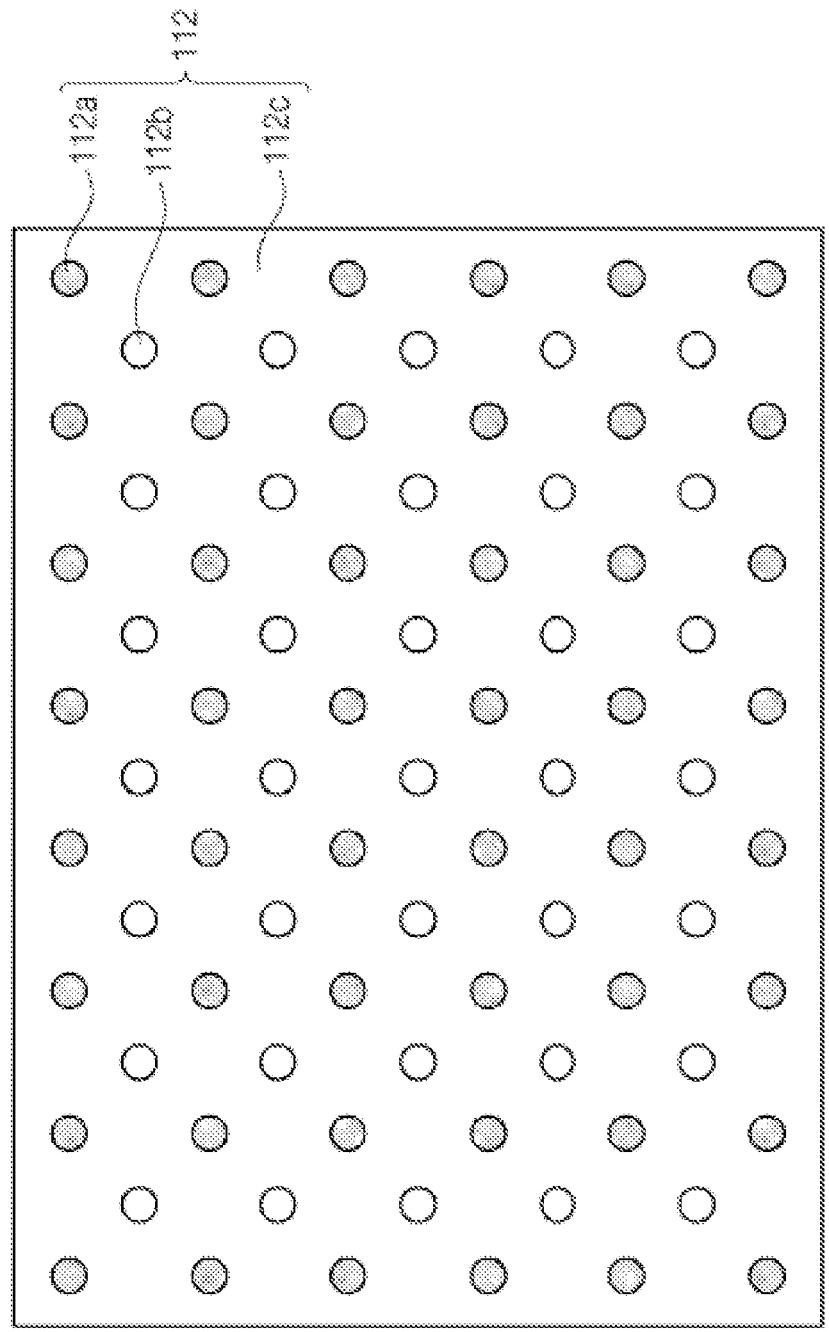

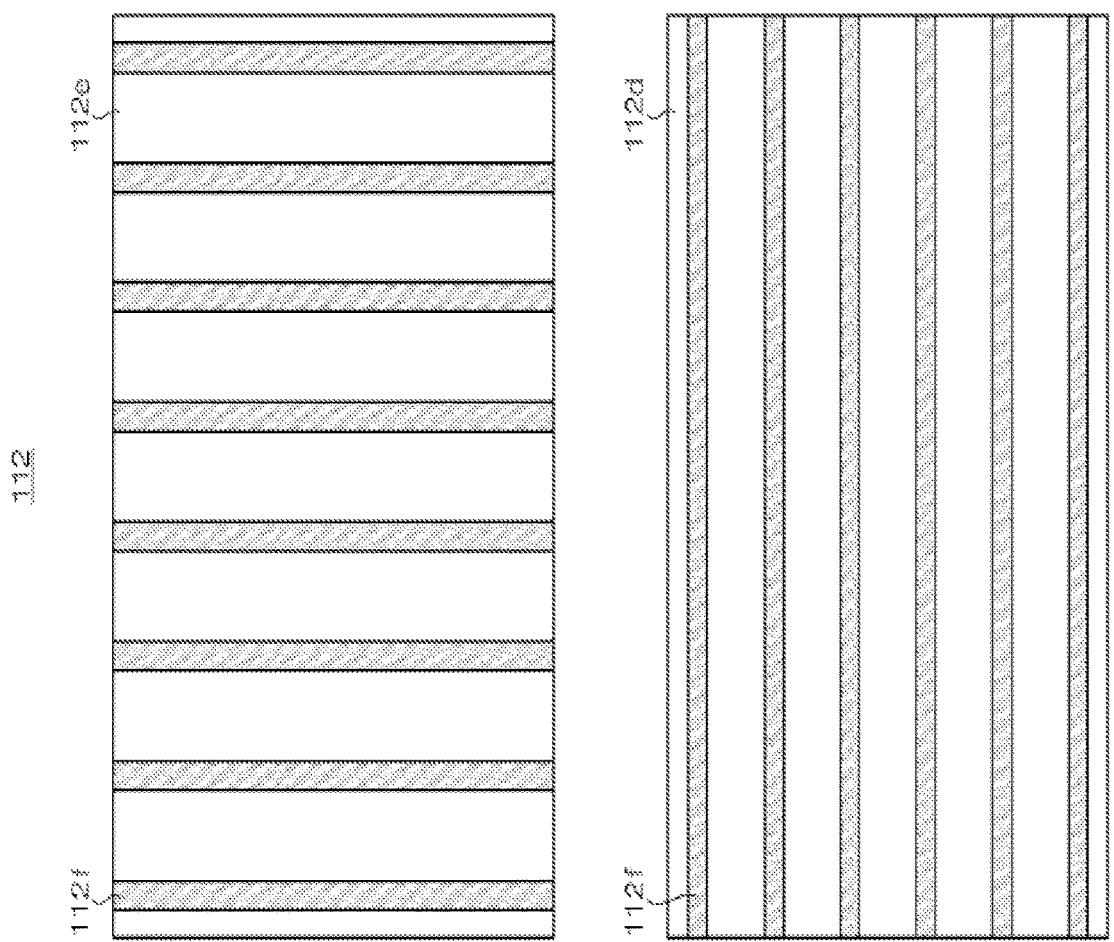

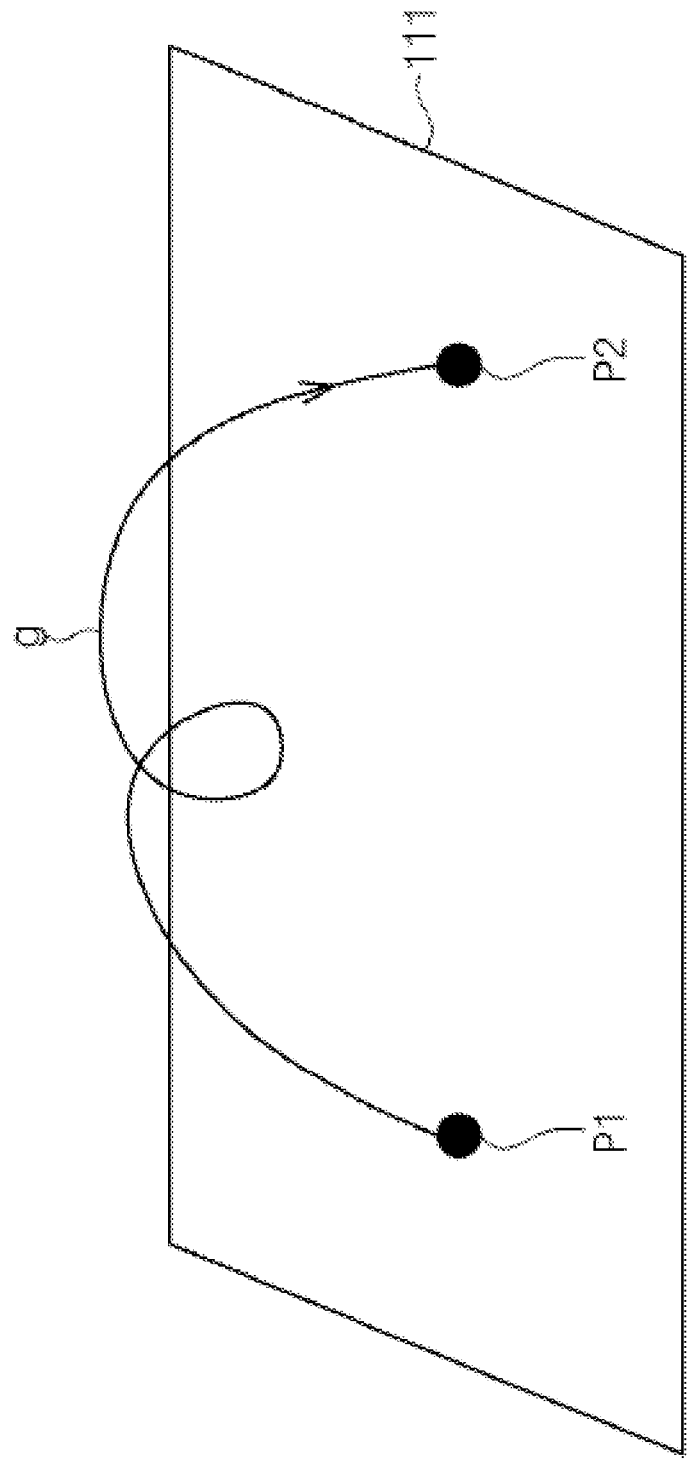

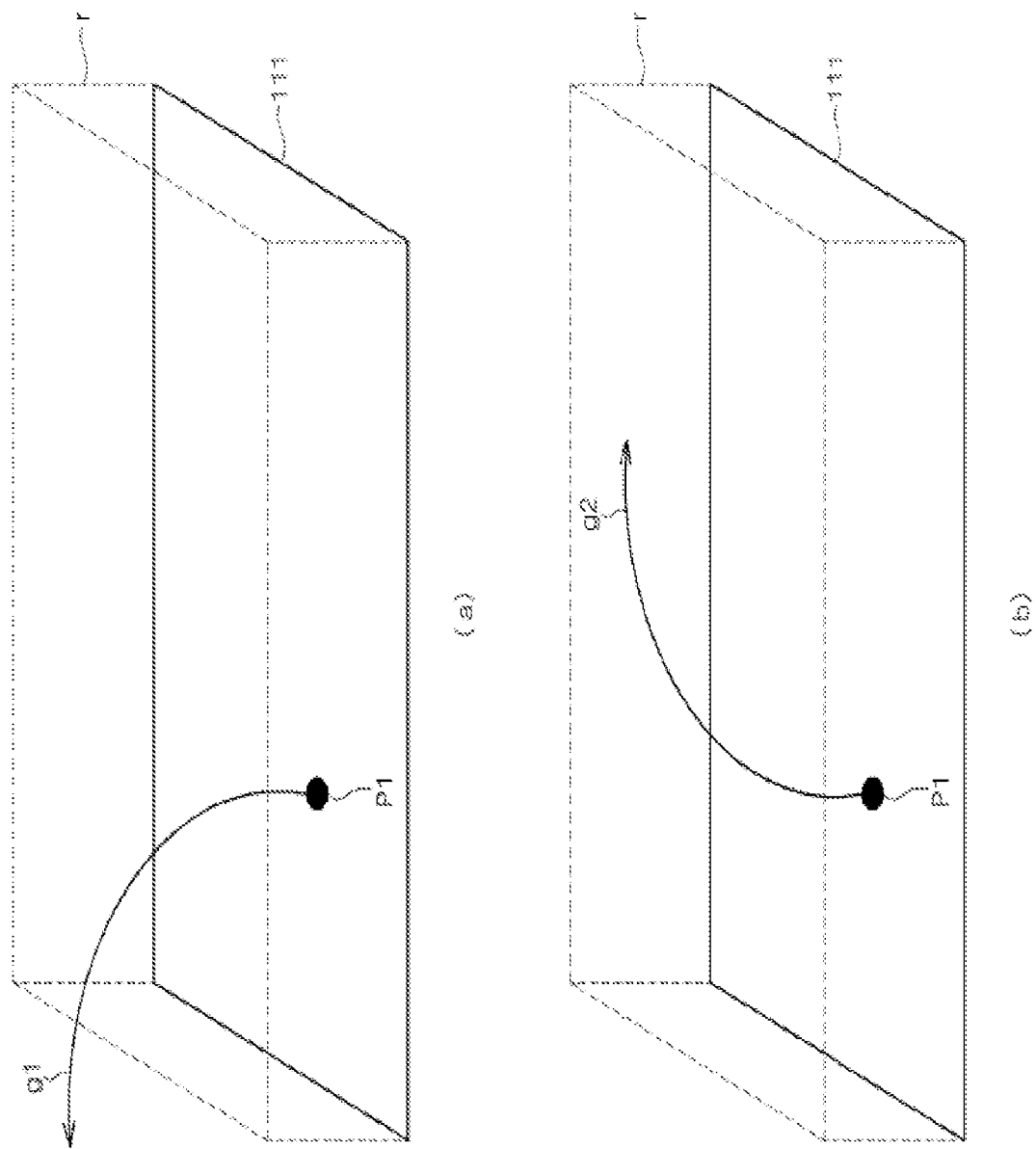

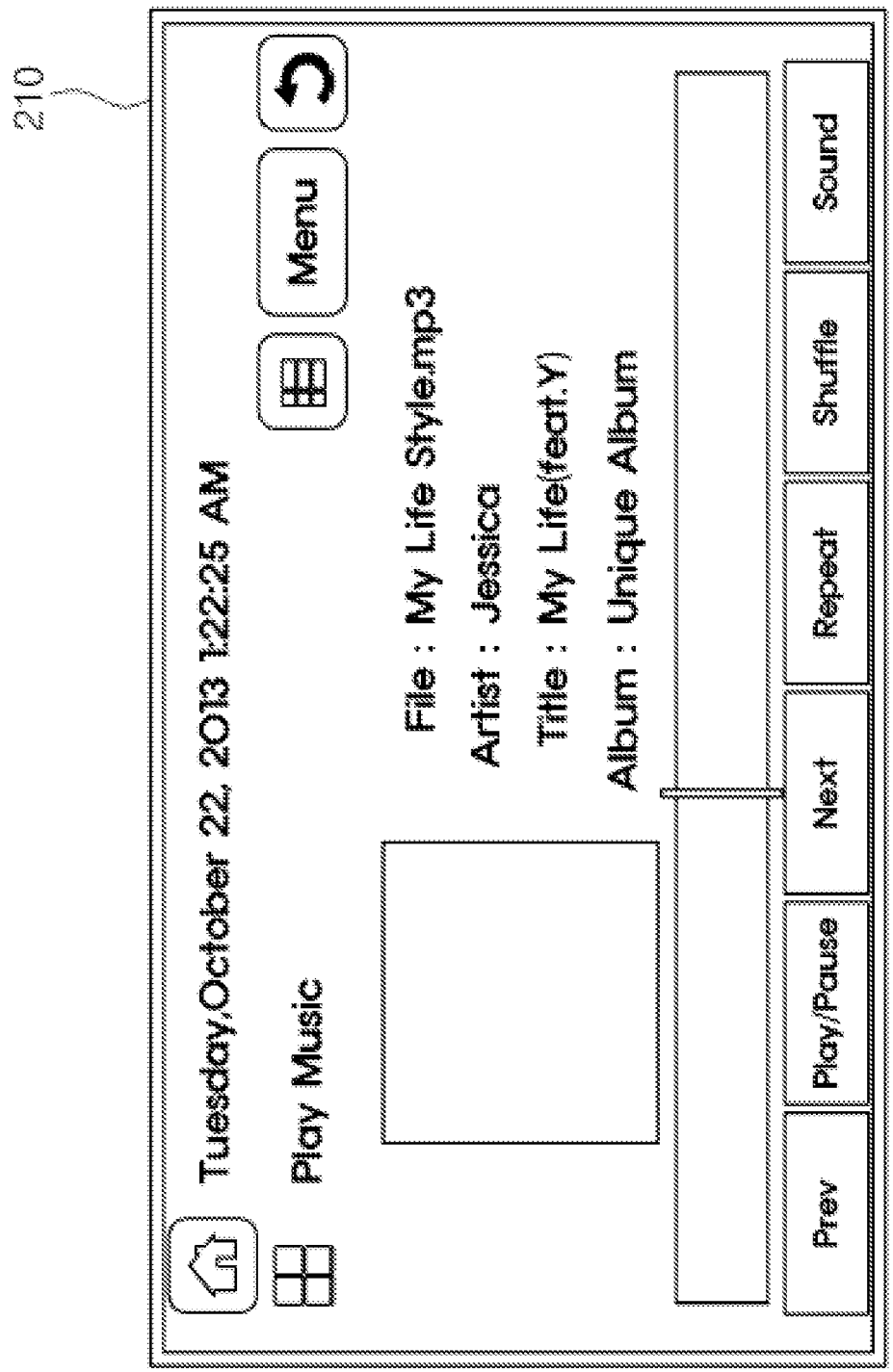

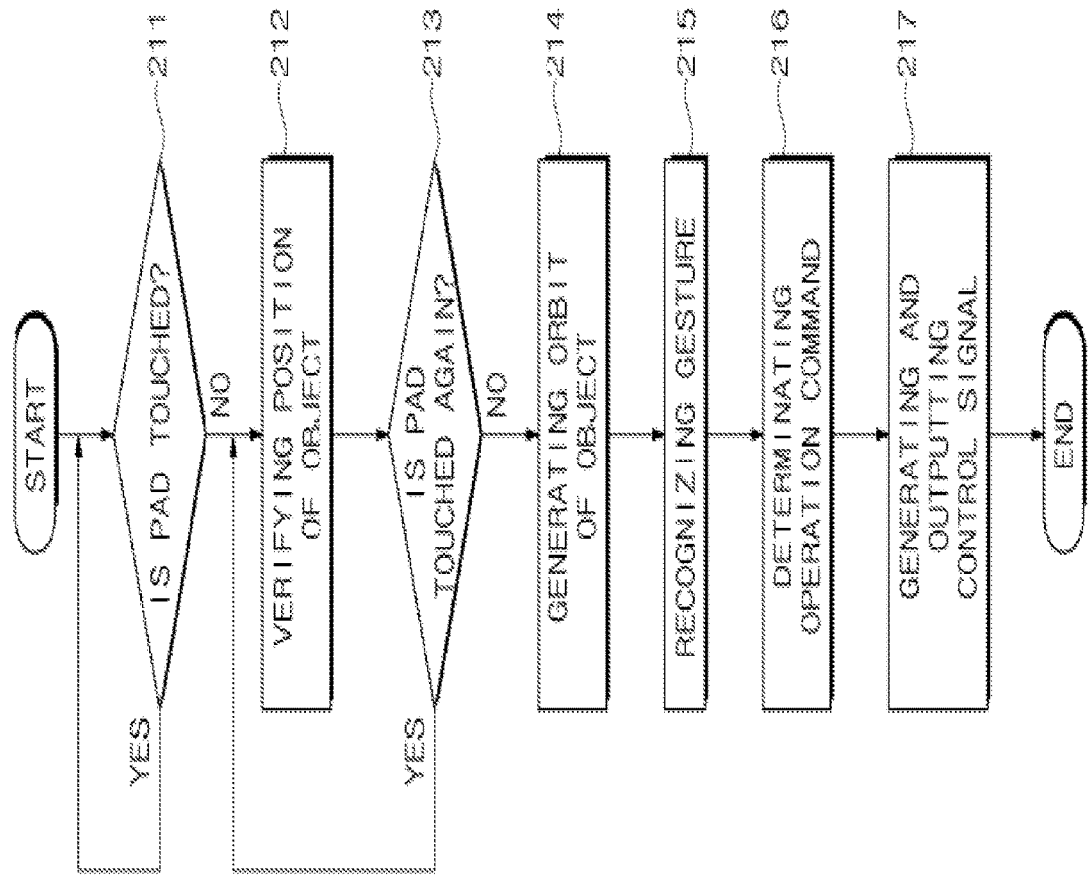

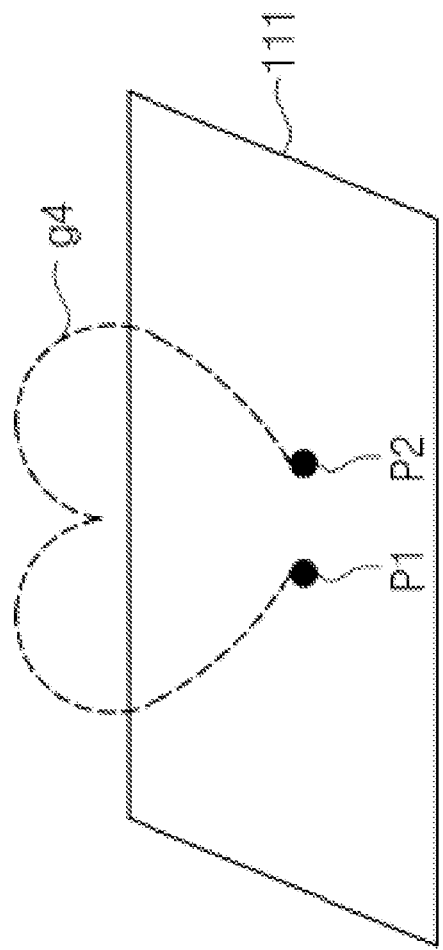

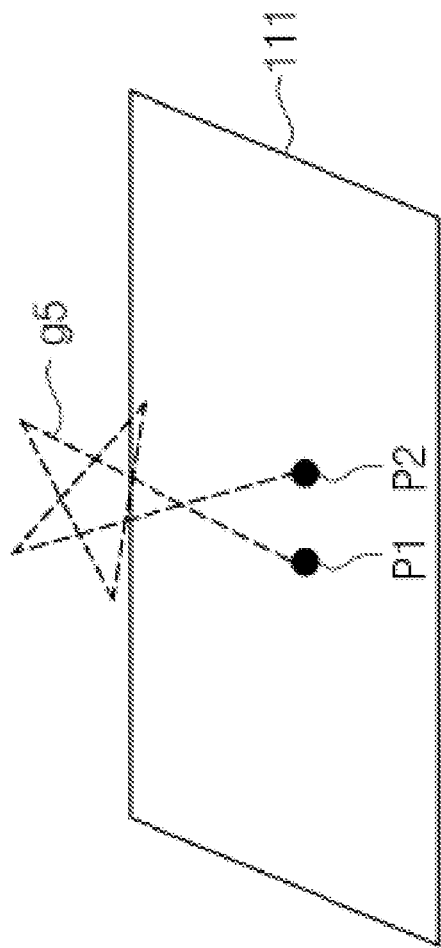

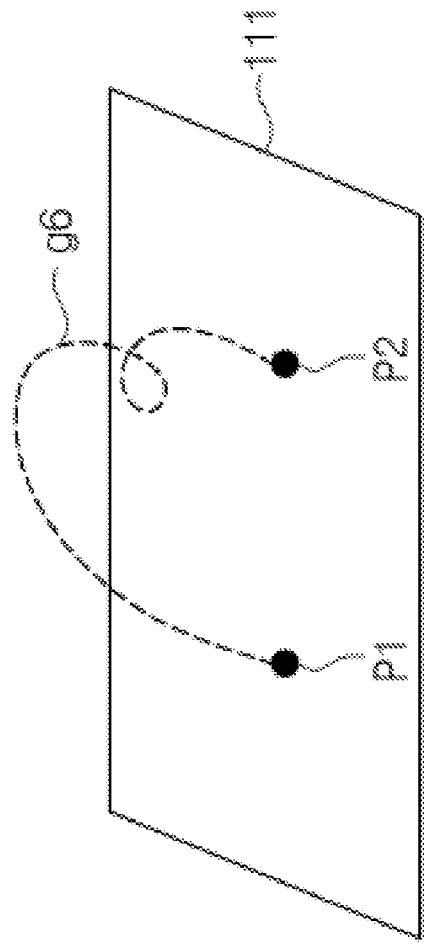

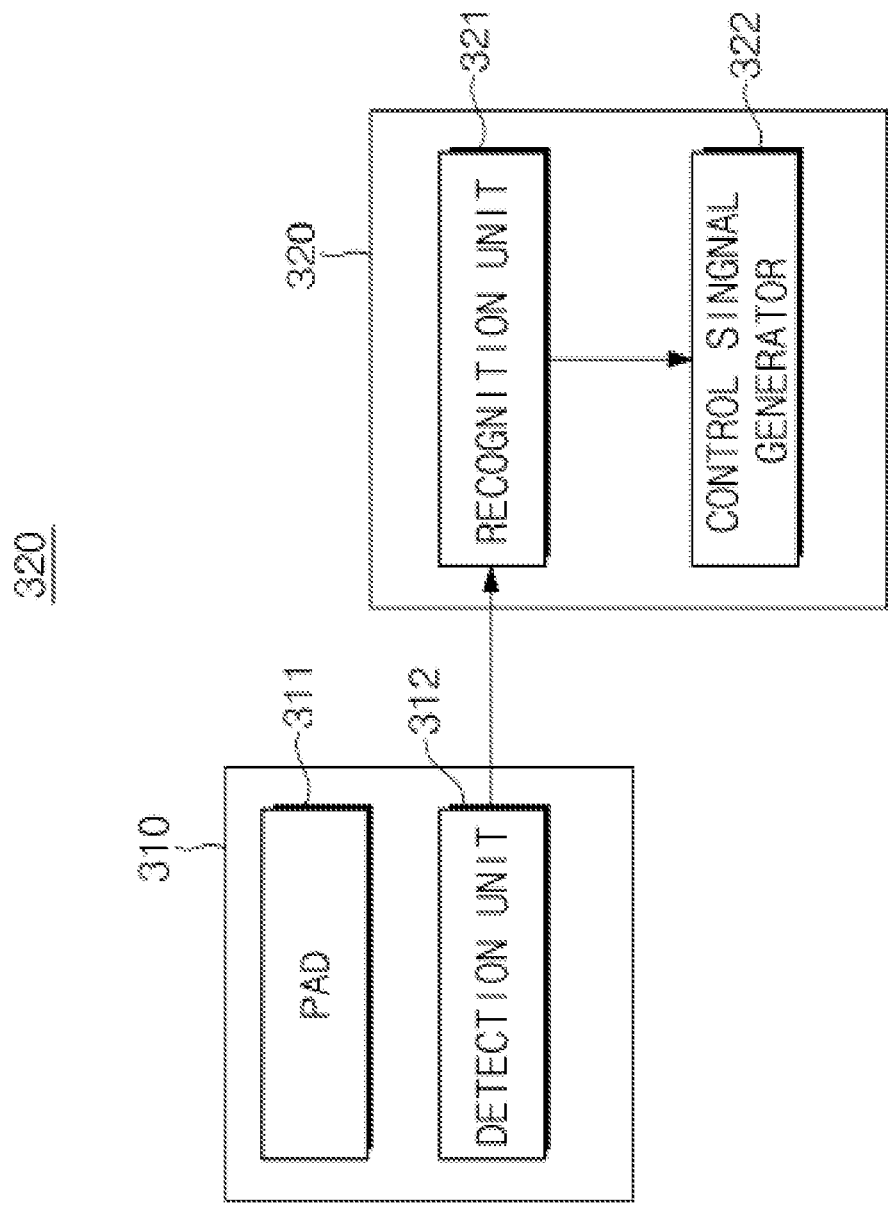

TERMINAL, FOR GESTURE RECOGNITION AND OPERATION COMMAND DETERMINATION, VEHICLE HAVING THE SAME AND METHOD FOR CONTROLLING THE SAME

CROSS-REFERENCE TO RELATED APPLICATION(S)

This application claims the benefit of Korean Patent Application No. 2014-0028262, filed on Mar. 11, 2014 in the Korean Intellectual Property Office, the disclosure of which is incorporated herein by reference.

TECHNICAL FIELD

Embodiments of the present disclosure relate to a terminal to receive commands from users, and a vehicle having the same and a method for the controlling the same.

BACKGROUND

Besides driving function, a vehicle further includes additional functions such as audio function, video function, navigation, air conditioning system, seat control, and lighting control for the user convenience.

To perform those functions, a vehicle is provided with a terminal configured to display menu screen or control screen by receiving an operation command about selected menu, or by receiving selected menu from the user according to a hard key method, a touch screen method and a gesture recognition method.

In the case of applying the hard key method to input a command to the terminal, a physically large space may be consumed to be provided with a plurality of hard keys. Alternatively, there is may be problems of increasing load of manipulation of the user to receive an operation command by a few hard keys, and in addition, at night, a lighting button, such as, a light-emitting diode (LED), and a button instrument may be needed for the identification of the physical buttons, and thereby increasing a manufacturing cost of the terminal.

In the case of applying the touch screen method to input a command to the terminal, drivers may touch each time the terminal to input an operation command so it is possible to affect safe driving.

In the case of applying the gesture recognition method to input a command to the terminal, the gesture is composed of touching, dragging and releasing. As such, manipulating may be performed only when being bound to a surface thereof.

In addition, when recognizing touching gestures and space gestures on the touch screen, a certain shape of hand or using a motion, such as a predetermined time stop are used. At this time, when a motion of hand is unnatural or hand movement is unintentional, the motion command may be wrongly recognized. Moreover, distinguishing the start of a gesture from the end of the gesture may be accomplished in a natural continuous operation. As such, the terminal may not accurately recognize the gesture that the user intended.

Therefore, by using the gesture recognition method input the operation command, there may be a problem that the terminal malfunctions because the operation command the user intended may not be accurately recognize

SUMMARY

Therefore, an aspect of the present disclosure provides a terminal capable of specifying a start time of recognizing a gesture by touch and determining an operation command corresponding to the recognized gesture, and a vehicle having the same and a method for the controlling the same.

Another aspect of the present disclosure provides a terminal capable of specifying a start time and an end time of recognizing a gesture by touch and determining an operation command corresponding to the gesture recognized between the start time of the gesture recognition and the end time of the gesture recognition, and a vehicle having the same and a method for the controlling the same.

Additional aspects of the present disclosure will be set forth in part in the description which follows and, in part, will be obvious from the description, or may be learned by practice of the invention.

In accordance with one aspect of the present disclosure, a terminal includes an input unit configured to detect contact of an object and a position of the object, and a controller configured to perform controlling by recognizing a gesture of the object, which is detected at a position spaced apart from the input unit when the object makes contact with the input unit.

The terminal may further include an output unit configured to perform an operation based on a control signal transferred from the controller.

The controller may recognize the gesture of the object by following (i.e., tracking) a position of the object from when the object is separated from the input unit, and may determine an operation command corresponding to the recognized gesture.

The controller may recognize a shape of the object when a distance between the input unit and the object is maintained during a certain period of time, and may recognize a gesture corresponding to the recognized shape of the object.

The input unit may include a pad for contact with the object, and a detection unit installed adjacent to the pad and configured to detect whether the object makes contact with the pad and the position of the object.

The detection unit may include at least one of a capacitance sensor, an ultrasonic sensor, and an optical sensor.

The controller may recognize a gesture of the object until when the object is not detected.

The controller may recognize a gesture of the object until then the input unit is touched again.

The controller may verify a matching ratio by comparing the recognized gesture with the pre-stored reference gesture, and may determine an operation command corresponding to the reference gesture having the highest matching ratio in the verified matching ratio.

In accordance with another aspect of the present disclosure, a terminal includes an input unit configured to detect contact of an object and a position of the object, and a controller configured to perform controlling by recognizing a gesture detected between a first touch point in contact with the object and a second touch point in contact again with the object.

The position of the object may include a moving direction of the object and a distance to the input unit.

The terminal may further include an output unit configured to perform an operation based on a control signal transferred from the controller.

The controller may recognize a gesture by tracking a position of the object from when the object is separated after the object was in contact with the input unit until when the object is in contact again, and may determine an operation command corresponding to the recognized gesture.

The controller is configured to track a position of the object from when the object is separated from the input unit after the object was in contact with the input unit, and may terminate tracking the position of the object when the object is in contact again.

The controller is configured to recognize a shape of the object when a distance between the input unit and the object is maintained during a certain period of time after the object was in contact, and may recognize a gesture corresponding to the recognized shape of the object.

The input unit is configured to include a pad for contact with the object, and a detection unit installed adjacent to the pad and configured to detect whether the object makes contact with the pad and the position of the object.

The detection unit is configured to include at least one of a capacitance sensor, an ultrasonic sensor, and an optical sensor.

The controller is configured to verify the matching ratio by comparing the recognized gesture with the pre-stored reference gesture, and to determine an operation command corresponding to the reference gesture having the highest matching ratio in the verified matching ratio.

In accordance with another aspect of the present disclosure, a control method of a terminal includes determining whether an object makes contact with an input unit, determining whether the object is separated from the input unit after determining that the object made contact with the input unit, recognizing a gesture of the object by tracking a position of the object from when the object is separated upon determining that the object is separated from the input unit, and performing controlling corresponding to the recognized gesture.

The tracking of the position of the object may include tracking of the position of the object until when the object is not detected.

The tracking of the position of the object may include tracking of the position of the object until when the object makes contact with the input unit again.

The recognizing of the gesture of the object may include generating an orbit (e.g. path and trajectory) of the object by connecting the position of the object, which is tracked, with the course of time, and recognizing the gesture corresponding to the generated orbit.

The control method of the terminal may further include recognizing an operation command corresponding to the recognized gesture, generating a control signal corresponding to the recognized operation command, and outputting the generated control command to the output unit.

The control method of the terminal may further include determining whether a distance between the input unit and the object is maintained during a certain period of time after the object is separated, recognizing a shape of the object when a distance between the input unit and the object is determined to be maintained during a certain period of time after the object is separated, and recognizing the gesture corresponding the recognized shape of the object.

The tracking of the position of the object may include determining continuously the position of the object based on a position and a size of a detection signal output from the input unit.

The detection signal may be at least one of a capacitance signal, an ultrasonic signal, and an optical signal.

The control method of the terminal may further include verifying the matching ratio by comparing the recognized gesture with the pre-stored reference gestures, and determining an operation command corresponding to the reference gesture having the highest matching ratio in the verified matching ratio.

In a vehicle provided with a terminal configured to perform a navigation function, an audio function, and a video function, the terminal includes an input unit configured to detect contact of an object and a position of the object, a controller configured to perform controlling by recognizing a gesture of the object which is detected at a position spaced apart from the input unit after the object contacted the input unit, an output unit configured to perform an operation based on a control signal transferred from the controller.

The input unit and the output unit may be detachably mounted.

The controller of the vehicle is configured to recognize the gesture of the object by tracking the position of the object from when the object is separated from the input unit, and to determine an operation command corresponding to the recognized gesture.

The operation command of the vehicle may include operation commands of an air conditioner, a seat, a heater, a radio, and a wiper.

The controller of the vehicle is configured to recognize a shape of the object when a distance between the input unit and the object is maintained during a certain period of time, and to recognize a gesture corresponding to the recognized shape of the object.

The controller of the vehicle is configured to recognize a gesture of the object until when the object is not detected.

The controller of the vehicle is configured to recognize structure of the object until when the input unit is touched again.

The controller of the vehicle is configured to determine matching ratios by comparing the recognized gesture with the pre-stored reference gestures, and to determine an operation command corresponding to a reference gesture having the highest matching ratio.

BRIEF DESCRIPTION OF THE DRAWINGS

These and/or other aspects of the present disclosure will become apparent and more readily appreciated from the following description of embodiments, taken in conjunction with the accompanying drawings of which:

FIGS. 5a and 5b illustrate a side cross-section view and a plane cross-section view of an example of an input unit including a plurality of light sensors.

FIG. 6 is illustrates a cross-section of an exemplary input unit including a capacitive sensor with a plurality of electrodes.

FIGS. 7a and 7b illustrate recognition of a gesture being performed on a surface of a pad of the terminal.

FIGS. 9a and 9b illustrate recognitions of two gestures being performed on a surface of a pad of the terminal according to one embodiment.

FIGS. 10a, 10b, and 10c illustrate an example of changes in an operation of an output unit corresponding to gestures recognized by the terminal according to one embodiment.

FIG. 11 is a control flow chart of a process for recognizing a gesture by a terminal according to another embodiment.

FIGS. 12A-12D illustrate example of recognized gestures performed on a surface of a pad of the terminal according to another embodiment.

FIG. 21 is a control lock diagram illustrating components of a terminal according to another embodiment.

DETAILED DESCRIPTION

Reference will now be made in detail to embodiments of the present disclosure, examples of which are illustrated in the accompanying drawings.

Figure 1:
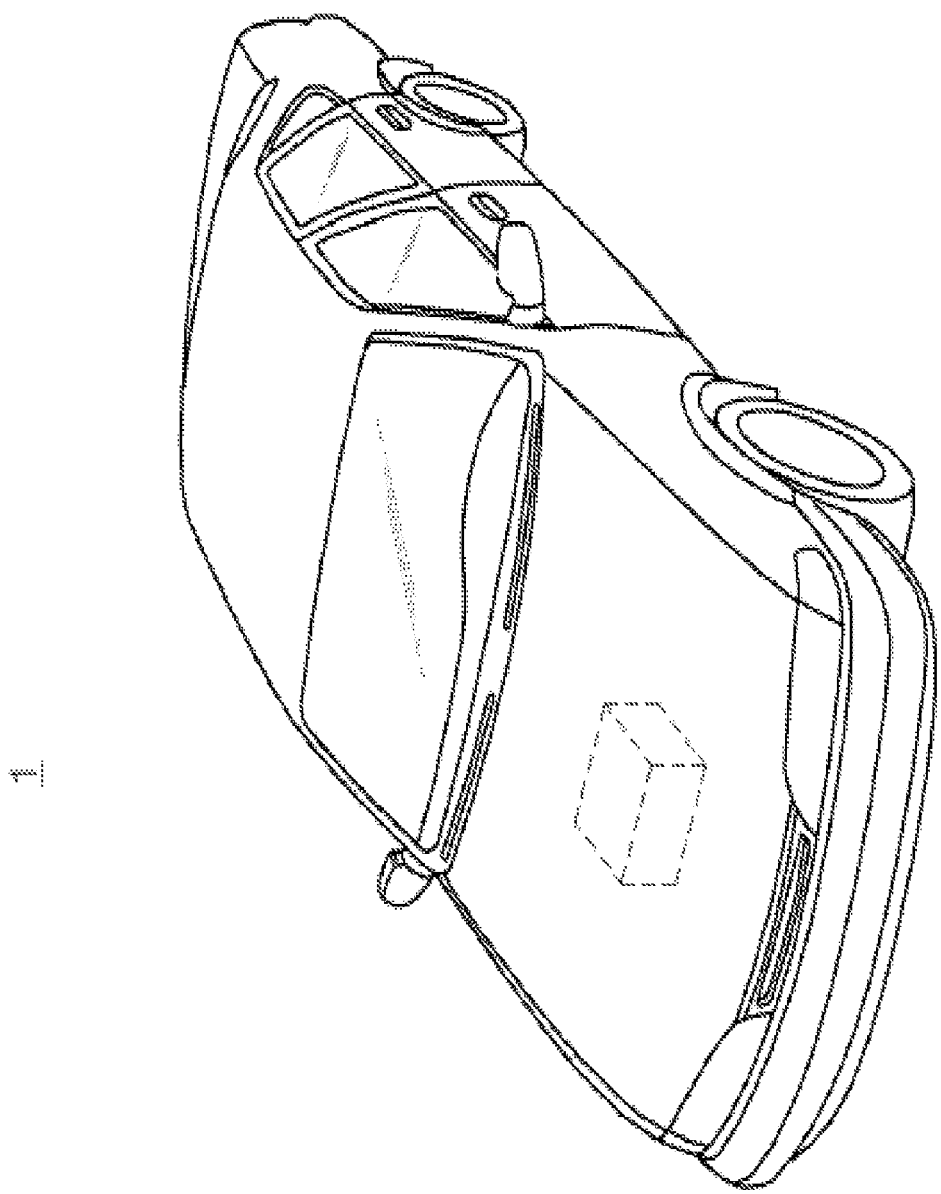
FIG. 1 is a perspective view illustrating an example of a vehicle according to one embodiment.
Figure 2:
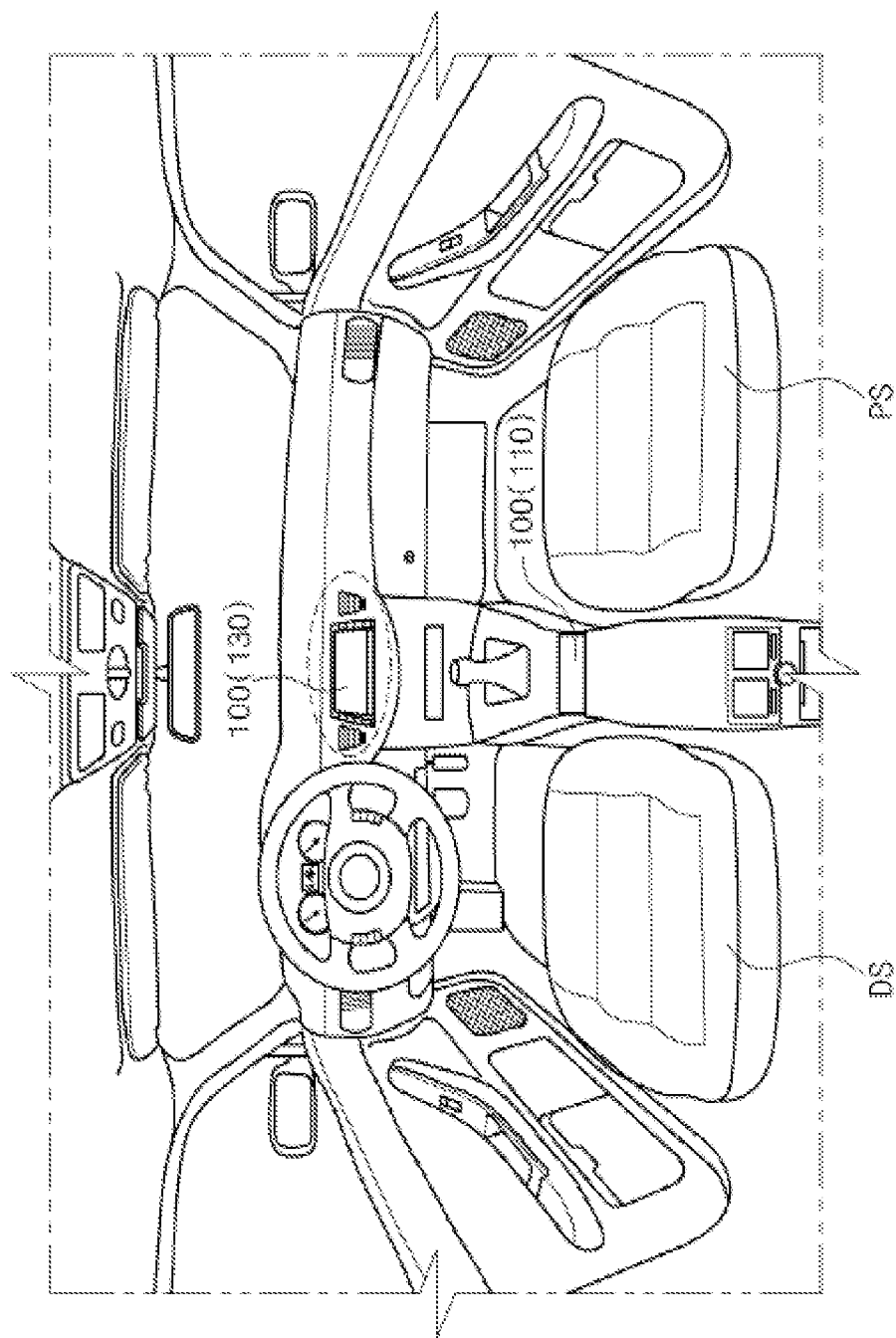
FIG. 2 is a perspective view illustrating a terminal mounted on the vehicle when viewed from a back seat.
Figure 3:
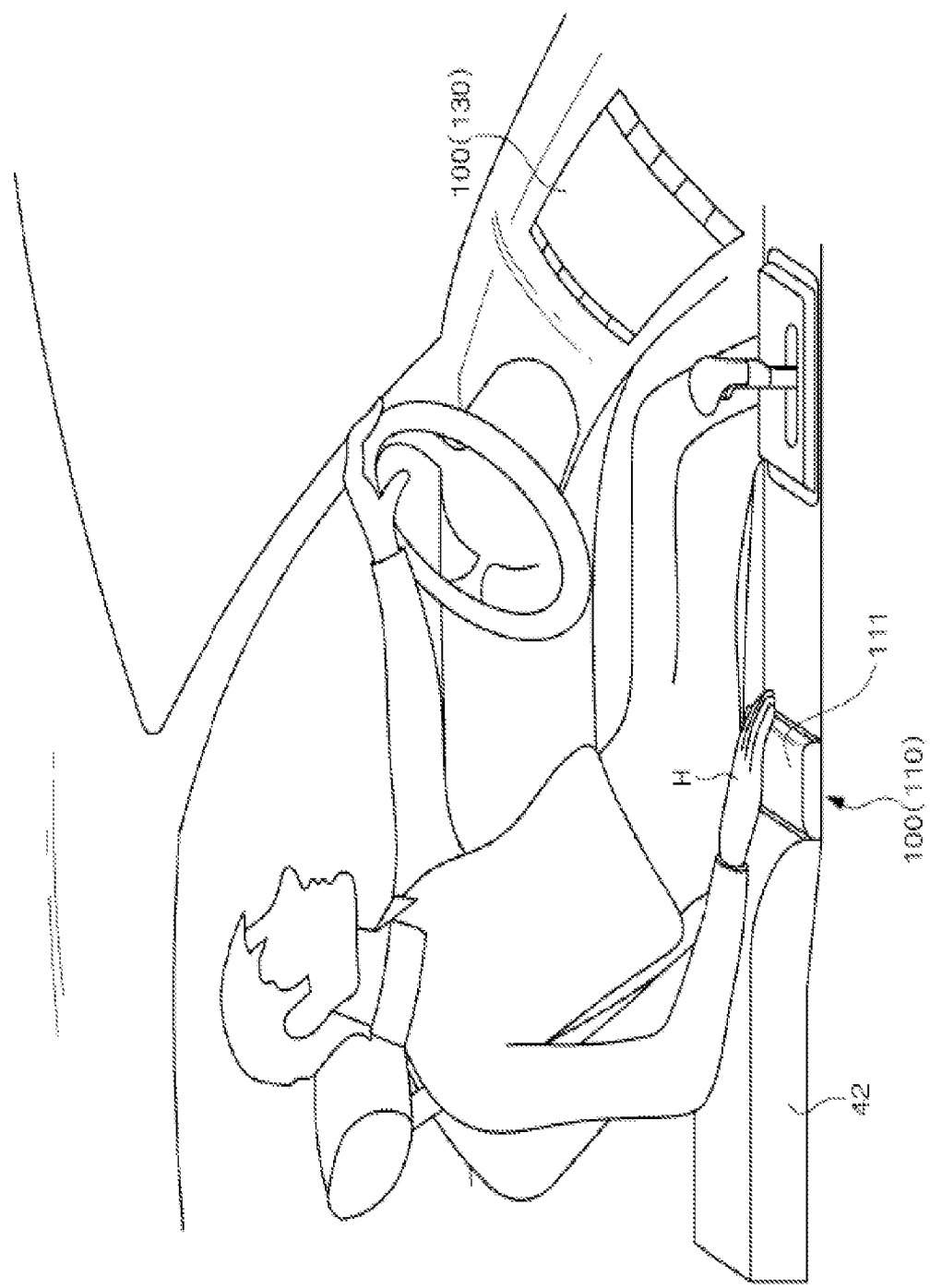
FIG. 3 is a perspective view illustrating a terminal mounted on the vehicle when viewed from a front passenger seat.

FIG. 1 is a perspective view illustrating an example of a vehicle according to one embodiment, FIG. 2 is a perspective view illustrating a terminal mounted on the vehicle when viewed from a back seat, and FIG. 3 is a perspective view illustrating the terminal mounted on the vehicle when viewed from a passenger seat. A vehicle 1 is a mobile transportation machine that travels along a road or rails to move transported subjects such as humans and objects by driving wheels.

The vehicle 1 may include a body provided with an interior and an exterior, and a chassis, that is, the remaining portion except the body, on which machineries for driving are installed.

As illustrated in FIG. 1, the exterior of the body may include a front panel, a hood, a roof panel, a rear panel, a trunk, a front right door, a rear right door, a front left door and a rear left door.

The exterior of the body may further include a filler provided on a boarder among a front panel, a hood, a roof panel, a rear panel, a trunk, front doors, and rear doors. In addition, the exterior of body may further include a side window glass installed on each front door, each rear door, a quarter window glass fixedly installed on between the filers, a rear window glass installed on the rear, and a front wind glass installed on the front.

The exterior of the body may further include a side view mirror configured to provide visibility of areas behind and to a side of the vehicle 1, and outside of the driver's peripheral vision.

As illustrated in FIG. 2, the interior of the vehicle body may include a seat in which a passenger sits, a dashboard, a gauge board 210, such as, a speedometer, a fuel gauge, an automatic transmission selector lever indicator, a tachometer, a trip meter, and the like, disposed on the dashboard and configured to output information related to traveling, a steering wheel configured to manipulate a direction of the vehicle, and a center fascia provided with control panels of an air conditioner and audio system.

The seat may include a driver seat (DS) where a driver sits, a passenger seat (PS) where a passenger sits, and a back seat disposed on the rear of the inside of the vehicle.

The center fascia may be disposed in a portion of the dashboard between the drive seat and the passenger seat, and may be provided with a control panel. A manipulation unit configured to adjust an audio device, an air conditioner, and a heater, a blower, and a cigar jack may be installed on the center fascia.

The chassis of the vehicle may include a power generating apparatus, a power transmission apparatus, a traveling apparatus, a steering system, a brake system, a suspension system, a transmission, a fuel system, and front, rear, left and right wheels.

In addition, at the vehicle, safety devices may be provided for the safety of a driver and passengers.

The safety devices may include an air bag controller for the safety of the occupant, such as a driver, when a vehicle is crashed, an electronic stability control (ESC) for controlling the posture of the vehicle during cornering and acceleration of the vehicle, and various types of safety devices.

In addition, the vehicle 1 may further include a detection apparatus, such as, a proximity sensor for detecting obstacles placed in the rear and the lateral or other vehicles, a rain sensor for detecting a precipitation and whether it is raining, and the like.

The vehicle may further include a hands-free device, a GPS, an audio device, a Bluetooth device and a rear camera for drivers' convenience.

As illustrated in FIG. 2, the vehicle may further include a terminal 100, such as, audio, video, navigation device (AVN) for performing an audio function, a video function, a navigation function, mounted on a center fascia that is the central portion of the dashboard.

The navigation function is calculating the current position of the vehicle on the basis of the position information provided by a plurality of satellites, and displaying by matching the current position on a map. That is, performing a route search from the current position to a destination on the basis of the path routing algorithm after receiving the destination from the user, displaying by matching the map on the searched route, and guiding the user to the destination along the route.

The terminal 100 may be provided on the center fascia, and may include a control panel configured to control traveling and various devices in the vehicle.

The terminal 100 may include a user interface configured for inputting and outputting information, and may display an output information on an output unit in response to an input information input through an input unit of the user interface, or may control various apparatus in response to an input information input through the input unit.

The terminal 100 may be configured to transmit an output information in response to an input information, and an operation command to external devices.

As illustrated in FIG. 3, the terminal 100 may include an input unit 110 and an output unit 130, both of which are separately installed from each other.

The input unit 110 configured to receive information may be provided at an end portion of one side of an arm rest, and the output unit 130 may be provided on the dashboard.

The input unit 110 may include a pad and may recognize hand gestures performed near to the pad.

While the user puts his/her arm on the arm rest, the user may input information on the input unit by using his/her hand. Therefore, even if the user does not enter an operation command, the user may maintain a comfortable state of resting a hand on the pad.

The output unit 130 may include a display unit, and the display unit may adapt Liquid Crystal Display (LCD), Light Emitting Diode (LED), Plasma Display Panel (PDP), Organic Light Emitting Diode (OLED), or Cathode Ray Tube (CRT).

The output unit 130 may act as a hot key by displaying a menu icon that is desired by the user by a simple operation.

The terminal 100 may also be mounted to an arm rest of the rear seat to receive an operation command from a passenger sitting in the rear seat.

The vehicle may be provided with a plurality of terminals 100, at this time, one terminal may be mounted on the dashboard, and another may be mounted on the armrest of the rear seat. The terminals may be embedded in the interior of the vehicle.

The terminal 100 may be detachable from the vehicle, and may be selectively disposed on the interior of the vehicle. The terminal 100 may be operable separately from the vehicle.

In one embodiment, Audio Video Navigation device (AVN) provided in the vehicle, and a control panel inside of a center fascia represents an example of a terminal, but is not limited thereto. A smart phone, a tablet, a laptop, a personal computer, a television may represent an example of a terminal.

Figure 4:
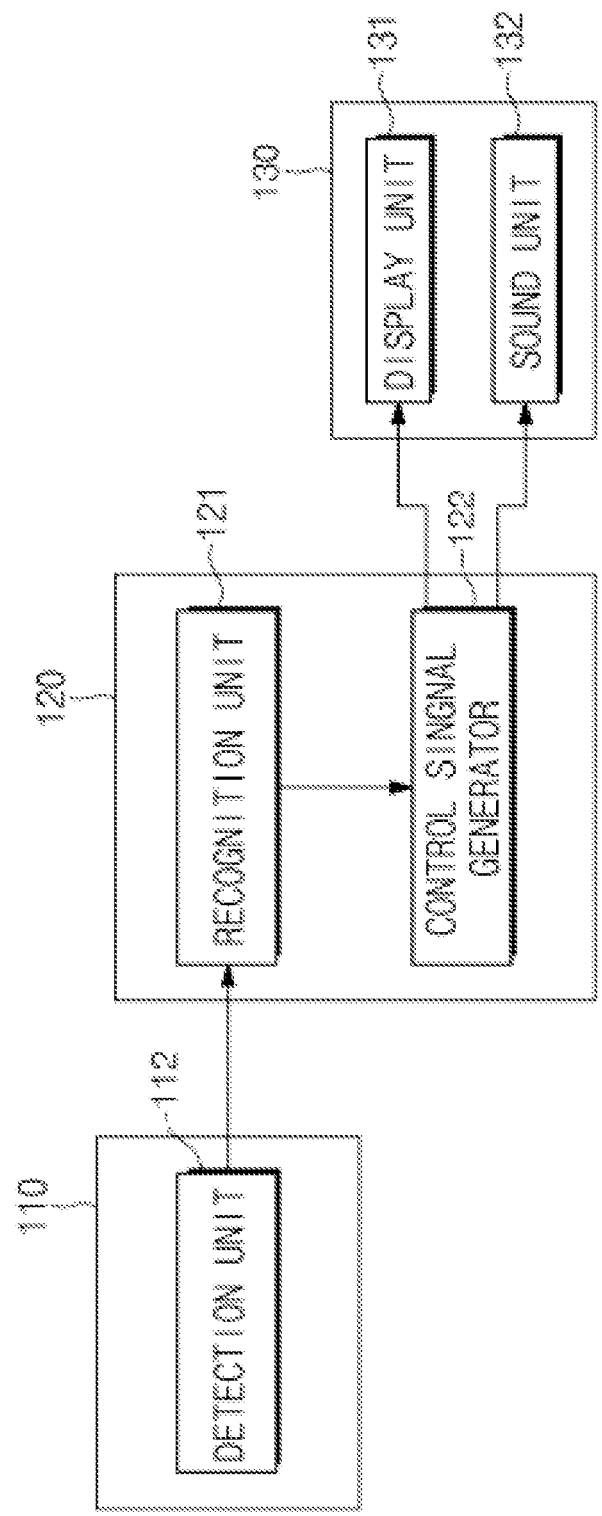
FIG. 4 is a control block diagram illustrating components of a terminal according to one embodiment.

FIG. 4 is a control block diagram illustrating the terminal according to one embodiment, and the terminal 100 includes an input unit 110, a controller 120 and an output unit 130. The input unit 110 receives an operation command by the user. The input unit 110 includes a pad 111, shown in FIG. 3, forming an external appearance thereof and which objects may be in contact with or be close to, and a detection unit 112, shown in FIG. 4, disposed on a lower portion of the pad 111 and configured to detect a position of the object adjacent to the pad 111. The object may include an operating body, such as, the users' hand and a touch pen.

Even if the user does not operate the pad, the pad 111 may be provided for the user to place his/her hand thereon for the user convenience. The detection unit 112 may be configured to detect whether the object is in contact with the pad 111 and a position of the object in contact with the pad 111. In addition, the detection unit 112 may be configured to detect a position of the object that is disposed on a separated space from the pad 111, and may output a detection signal. The position of the object may include information about distance and direction. That is, the position of the object may be the position in space of a certain range with respect to pad 111 and may be represented by X, Y, and Z coordinates.

The detection unit 112 may detect not only an object in contact with the pad 111, but also an object in the space within a certain range from the pad 111. The detection unit 112 may include a proximity sensor, and the proximity sensor may include at least one of a capacitance sensor, an ultrasonic sensor, and an optical sensor. The detection unit 112 may be provided in a way that a plurality of proximity sensors is two-dimensionally arranged, and the controller 120 may recognize a position of objects in three-dimensional space based on the size of the output signals outputted from the plurality of the proximity sensors.

The input unit 110 may further include a touch unit (not shown) configured to detect a pressure or a depression applied to the pad 111. That is, the input unit 110 may determine whether the object makes contact with the pad by the touch unit of the input unit 110.

FIGS. 5a and 5b are views illustrating an example of an input unit including a plurality of light sensors, FIG. 5a is a amide cross-sectional view of the input unit and FIG. 5b is a plane cross-sectional view of the detection unit. An input unit 110 may include a pad 111, and a detection unit 112 provided in one side of the pad 111. The detection unit 112 may include a plurality of light emitting units 112a disposed to be spaced apart from each other, a plurality of light receiving units 112b disposed to be spaced apart from each other, and a substrate 112c in which the plurality of light emitting units 112a and the plurality of light receiving units 112b are arranged.

The light emitting unit 112a may include a Light Emitting Diode (LED), and the light receiving unit 112b may include a phototransistor to detect light.

That is, the plurality of light emitting units 112a and the plurality of light receiving units 112b may be two-dimensionally arranged on the substrate 112c. The plurality of light emitting units 112a may be connected in a matrix manner to flash individually. The plurality of light receiving units 112b may be connected in parallel to act as an optical sensor having a wide surface.

When the light emitting unit 112a may adapt a light emitting diode (LED), an infrared filter (not shown) may be provided between the pad 111 and the detection unit 112 so that infrared light, which is generated in other light source aside from infrared light generated in the light emitting unit 112a, is prevented from being incident on the light receiving unit 112b.

In the absence of light, an output signal (OUT) output from the output stage of the photo transistor is maintained to be a value near the power supply voltage (VCC), and is dropped in proportion to the amount of the light when the light is incident.

As illustrated in FIG. 6, when an input unit may adopt a capacitance sensor as a detection unit, the input unit may include a plurality of electrodes 112f two-dimensionally arranged.

That is, a first plurality of electrodes 112f is arranged in the X-axis direction in a first panel 112e of the detection unit, and a second plurality of electrodes 112f is arranged in the Y-axis direction in a second panel 112d of the detection unit. That is, electrodes in the first and second panel of the detection unit are divided in the form of a matrix, and the electrodes are configured to recognize coordinates by using each line of the Y-axis and X-axis.

An electric field between the electrodes may be changed when objects or body is near, and electrostatic capacitances may be changed according to the change of the electric field.

The controller 120 determines an operation command of the user based on an output signal of the detection unit 112, and generates a control signal corresponding to the operation command the user intended.

The controller 120 includes a recognition unit 121 configured to recognize the user's gesture on the basis of the output signal of the detection unit 112, and a control signal generator 122 configured to determine an operation command corresponding to the recognized gesture, and generate a control signal in response to the determined operation command.

The controller 120 may be provided on the input unit 110, and may be separately provided on the outside of the input 110.

The controller 120 may be provided on the output unit 130.

In a case when a capacitance sensor is provided on the detection unit 112, the controller 120 recognizes a position of an object based on the changes of capacitance as the object approaches, and recognizes the change in the position of the object, which corresponds to the course of time.

In a case when ultrasonic sensor is provided on the detection unit 112, the controller 120 recognizes a position of object based on the intensity of the ultrasonic signal reflected back to the object and recognizes the change in the position of the object, which corresponds to the course of time.

In a case when an optical sensor is provided on the detection unit 112, the controller 120 recognizes a position of an object based on the intensity of the optical signal reflected back to the object and recognizes the change in the position of the object, which corresponds to the course of time.

After the output signal output from the phototransistor is input, the controller 120 calculates an object adjacent thereto, such as, the user's hand or a position of a finger, a distance to the input unit 110, an area and the like based on the output signal of the phototransistor and a position of Light Emitting Diode (LED) which is turned on.

The recognition unit 121 of the controller 120 determines whether an object is in contact with, verifies a blob of the object when the object comes into contact with the pad 111, and determines a position of the object by tracking the blob when the object is separated from the pad.

When the object comes into contact with the pad 111, the recognition unit 121 verifies a position of the object, which is changed from when the objected is separated from the pad 111, and recognizes a gesture corresponding to the change in position of the object.

The position of the object, which is changed, may represent an orbit of a moving object in a state where the object is in contact with a surface of the pad 111, or an orbit of a moving object in a state where the object is spaced apart from the pad 111.

The recognition unit 121 verifies a position of an object during a period of time from when the object is separated from the pad 111 until when the object is not detected.

Figure 7A:
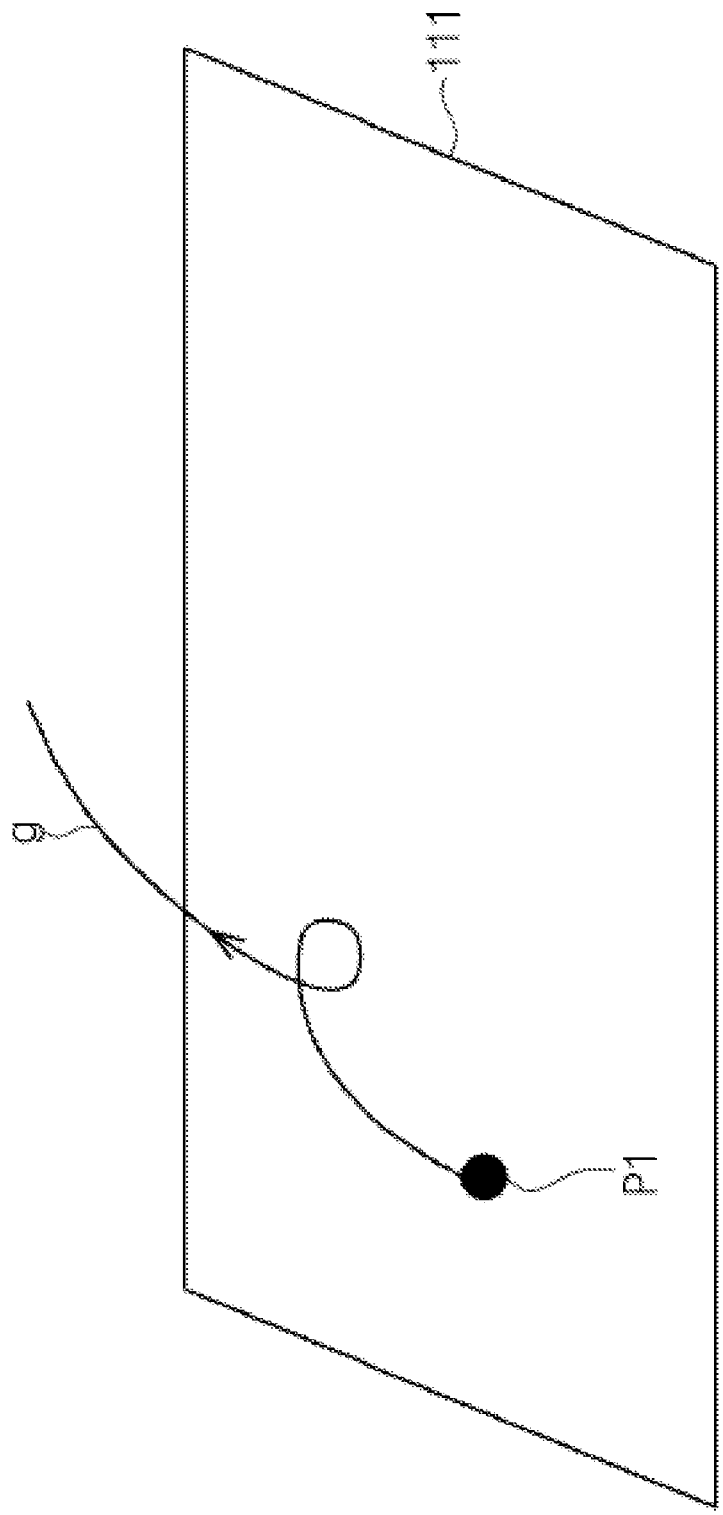

As illustrated in FIG. 7a, when the object is in contact with the surface of the pad 111, the recognition unit 121 determines a point in time when the object is in contact with the surface of the pad 111, as a point in time of an operation command input by the user, verifies a position of a moving object in a state where the object is spaced apart from the pad 111, terminates verifying the position when the object exceeds a certain range, generates an orbit of the object by connecting the position of the object moving from a position of a touch point (P1) as time is advanced, and recognizes the user's gesture (g) corresponding to the generated orbit of the object.

The controller 120 verifies the position of the object from when object is separated from the pad 111 until the object makes contact again with the pad 111.

As illustrated in FIG. 7b, when the object is in contact with the surface of the pad 111, the recognition unit 121 determines a point in time when the object is in contact with the surface of the pad 111 at the touch point (P1) as a point in time when inputting an operation command is started by the user, verifies a position of a moving object in a state where the object is spaced apart from the pad 111, when the object is in contact again with the surface of the pad 111 at touch point (P2), the recognition unit 121 determines a point in time when the object is in contact again with the surface of the pad 111 as a point in time when inputting an operation command is finished by the user, generates an orbit of the object by connecting the position of the object moving from a starting time to a finishing time as time is advanced, and recognizes the user's gesture (g) corresponding to the generated orbit of the object.

The recognition unit 121 may recognize a shape of a hand, and a distance between the pad 111 and the hand based on the output signal of the detection unit.

The recognition unit 121 may recognize a shape of a hand if a position of an object is maintained constantly during a certain period of time from when the object is separated from the pad 111 after the object makes contact with the pad 111.

Determining whether the position of the object is maintained constantly is determining whether a distance between the object and the pad 111 is maintained in a predetermined range of movement.

The control signal generator 122 compares a plurality reference gestures, which is pre-stored, with each of the recognized gesture, verifies a matching ratio each of the gesture, determines the reference gesture having the highest matching ratio in the verified matching ratio, determines an operation command corresponding to the determined reference gesture, and generates a control signal corresponding to the determined operation command.

Herein, the gesture may be referred to as an orbit of an object moving on the surface of the pad 111, and a shape of a hand.

The output unit 130 is configured to output information corresponding to the operation command, and includes at least one of a display unit 131 outputting information in a shape of a character, an image or the like or a sound unit 132 outputting information in a shape of a sound.

The display unit 131 includes a display panel and displays a character, an image or the like by the display panel.

The sound unit 132 includes a speaker, and outputs an operation call sound, music, a sound associated with navigation by the speaker.

Figure 8:
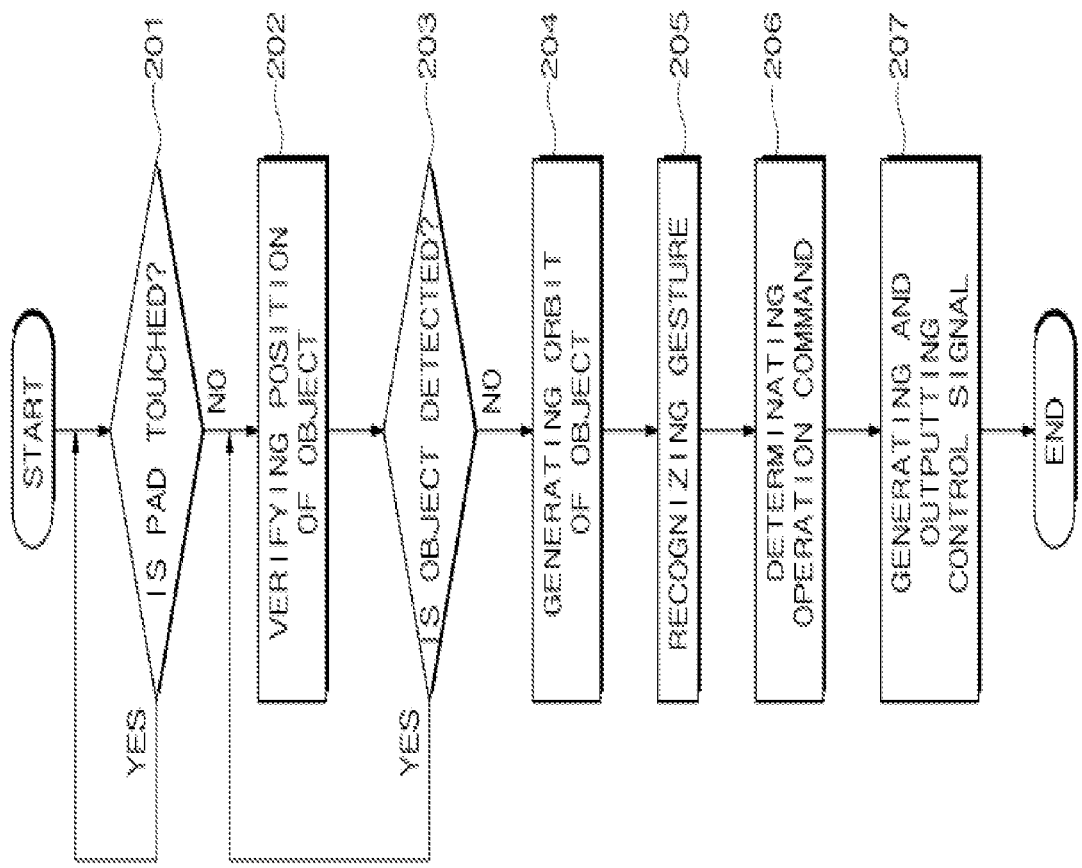
FIG. 8 is a control flowchart of a process for recognizing a gesture by the terminal according to one embodiment.

FIG. 8 is a control flowchart illustrating the terminal according to one embodiment.

A Terminal may represent Audio Video Navigation (AVN) device embedded in a vehicle, a control panel inside a center fascia, or a smart phone, a tablet, a lap top, or a personal computer, or a television, all of which are portable, thereby selectively attached to the vehicle.

In one embodiment, Audio Video Navigation device (AVN) provided in the vehicle will be described an example of a terminal.

An input unit 110 and an output unit 130 of Audio Video Navigation (AVN) device may be integrally embedded in a dashboard or separately installed on a different location.

In a case when the input unit 110 and the output unit 130 of the AVN device are separately installed, the input unit 110 may be provided on an arm rest, and the output unit 130 may be provided on a dashboard.

The AVN device determines whether a signal to start the operation is input to the input unit 110 while maintaining a standby state in which the output unit 130 is deactivated and the input unit is activated.

The signal to start the operation may be a touch signal, which is making contact with the input unit 110 of the pad 111, or turning on a start operation button.

When the signal to start the operation is input, the AVN device displays a main image on the display unit 131. The main image may be an image for displaying an icon representing each of a plurality of functions performed by the AVN device.

The AVN device determines whether the user makes contact with the pad 111 to input operation commands, at Step 201.

If the object is determined to make contact with the surface of the pad 111, the AVN device determines a point in time when the object is determined to make contact with the surface of the pad 111, as a starting time to input an operation command, and the AVN device verifies a position of a touch point where the object makes contact with.

The AVN device determines whether the object is separated from the pad 111 after the object is in contact with the pad 111, and verifies a position of the object which is moved in a state of being spaced apart from the pad 111 from when the object is separated from the pad 111, at Step 202.

The AVN devices determines whether the object is detected while verifying the position of the object, at Step 203, there by determining an end time of inputting the operation command.

The end time of inputting the operation command is that a point in time when a gesture as desired by the user is completed, that is, a point in time when the object is not detected since the position of the object is out of the predetermined range.

In addition, the end time of inputting the operation command may be a point in time when a detection signal of the object, that is, the output signal of the output unit is less than a predetermined size, or a point time when a detection signal of the object, that is, the output signal of the output unit is not detected.

The AVN device connects the position of the object detected from when the start time of inputting the operation command to when the end time of inputting the operation command.

That is, the AVN device generates an orbit by connecting positions of the object which is moved from the position of the touch point touched at the start time of inputting the operation command, with the course of time, at Step 204, and recognizes the user's gesture corresponding to the generated orbit of the object, at Step 205.

Herein, the position of the object includes a distance of the object spaced apart from the pad and a moving direction of the object. Therefore, the AVN device may recognize which direction the object is moved in while having a distance to the pad 111.

If the AVN device determines that the object is maintained to have a certain distance to the pad 111, the AVN device determines that a gesture is using a shape thereof not a gesture of the object moved consecutively, and recognizes the gesture corresponding to the shape of the object.

In addition, the gesture may have the shape of the object, and information of the distance between portions of the object and the pad 111.

The ANC device compares a plurality of reference gestures, which is pre-stored, with each of the gesture recognized, verifies a matching ratio each of the gesture, determines the reference gesture having the highest matching ratio in the verified matching ratio, determines an operation command corresponding to the determined reference gesture, at Step 206, generates a control signal corresponding to the determined operation command, and drives a load by outputting the control signal to the load, at Step 207.

Herein in, the load may include at least one of the display unit 131 or the sound unit 132. As mentioned above, they will be described with reference to FIGS. 9 and 10.

As illustrated in FIG. 9, at the AVN device, an operation command, corresponding to reference gestures performed in a certain range (r), is stored.

The reference gesture may be a gesture of moving in a direction with a certain distance, a gesture of drawing a circle repeatedly, or a gesture of writing a complicated letter.

As illustrated in (a) of FIG. 9, it is assumed that an operation command corresponding to a gesture of a curve moving to the left (g1) with respect to a touch point (p1) is a playing of a previous song, and as illustrated in (b) of FIG. 9, it is assumed that an operation command corresponding to a gesture of a curve moving to the right (g2) with respect to the touch point (p1) is a playing of a next song.

In addition, it is assumed that music files of No. 9, My life, and It's not you, are stored in order.

As illustrated in FIG. 10, in a state of performing an audio playback function, an AVN device 100 displays the information of the music currently playing by a display unit 131.

As illustrated in FIG. 10a, while displaying the information about 'My life' currently playing by the display unit 131, the AVN device 100 outputs the music by the sound unit and determines whether a touching event occurs on the pad 111 of the input unit 131.

If the pad 111 of the input unit 131 is determined to be touched, the AVN device verifies a position of a touch point being touched, and verifies a position of an object, which is changed from the position of the verified touch point.

If the object is not detected within a certain range, the AVN device generates an orbit by connecting the position of the object changed from the position of the touch point, with the course of time, and recognizes a gesture corresponding to the generated orbit of the object.

The AVN device determines the gesture having the highest matching ratio by device comparing reference gestures, which is pre-stored, with each of the recognized gesture.

Figure 10B:
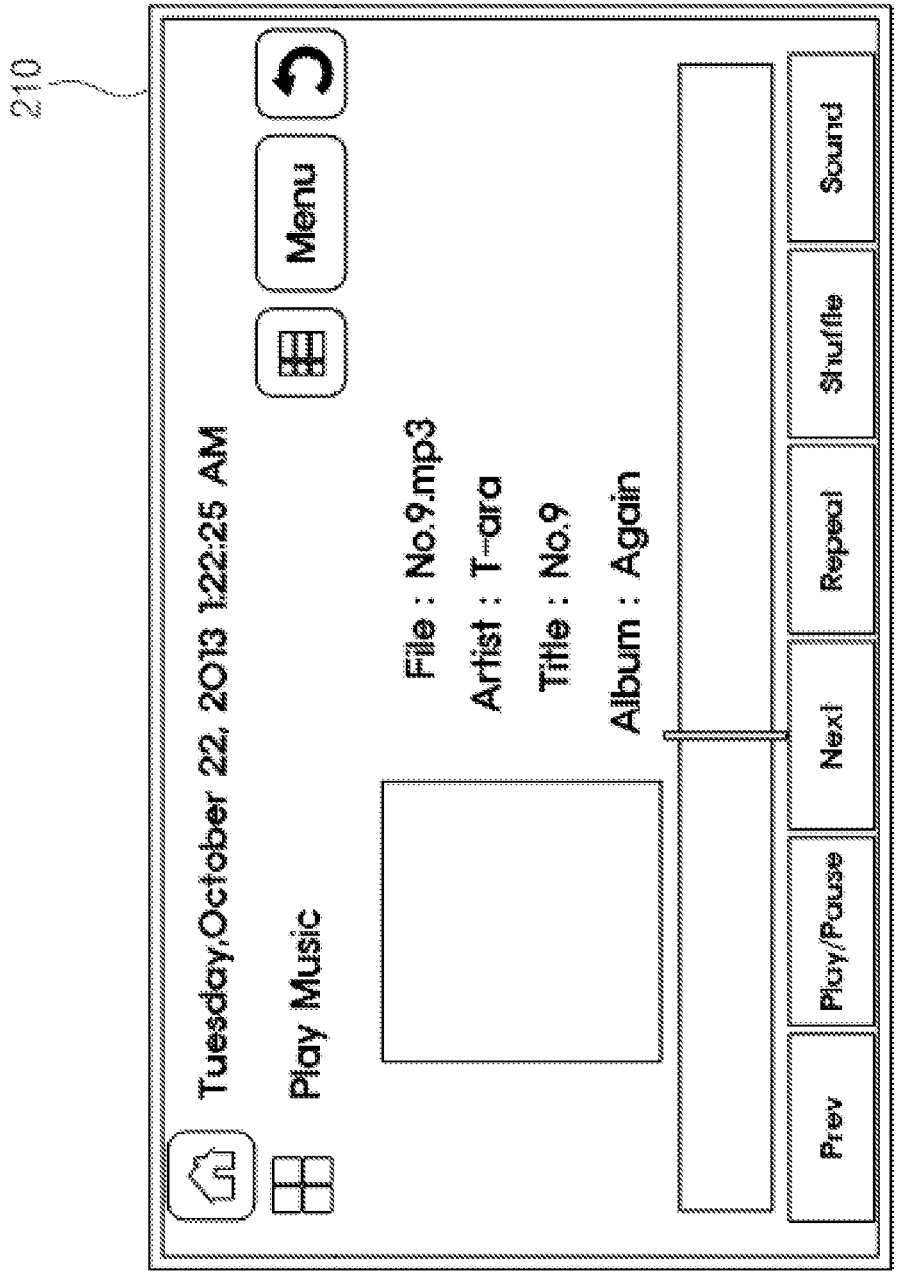

If the matching ratio between the recognized gesture and the reference gesture in (a) of FIG. 9 is determined to be the highest ratio, the AVN device displays the information about 'No 9' a previous song and outputs 'No. 9' by the sound unit, as illustrated in FIG. 10b.

Figure 10C:
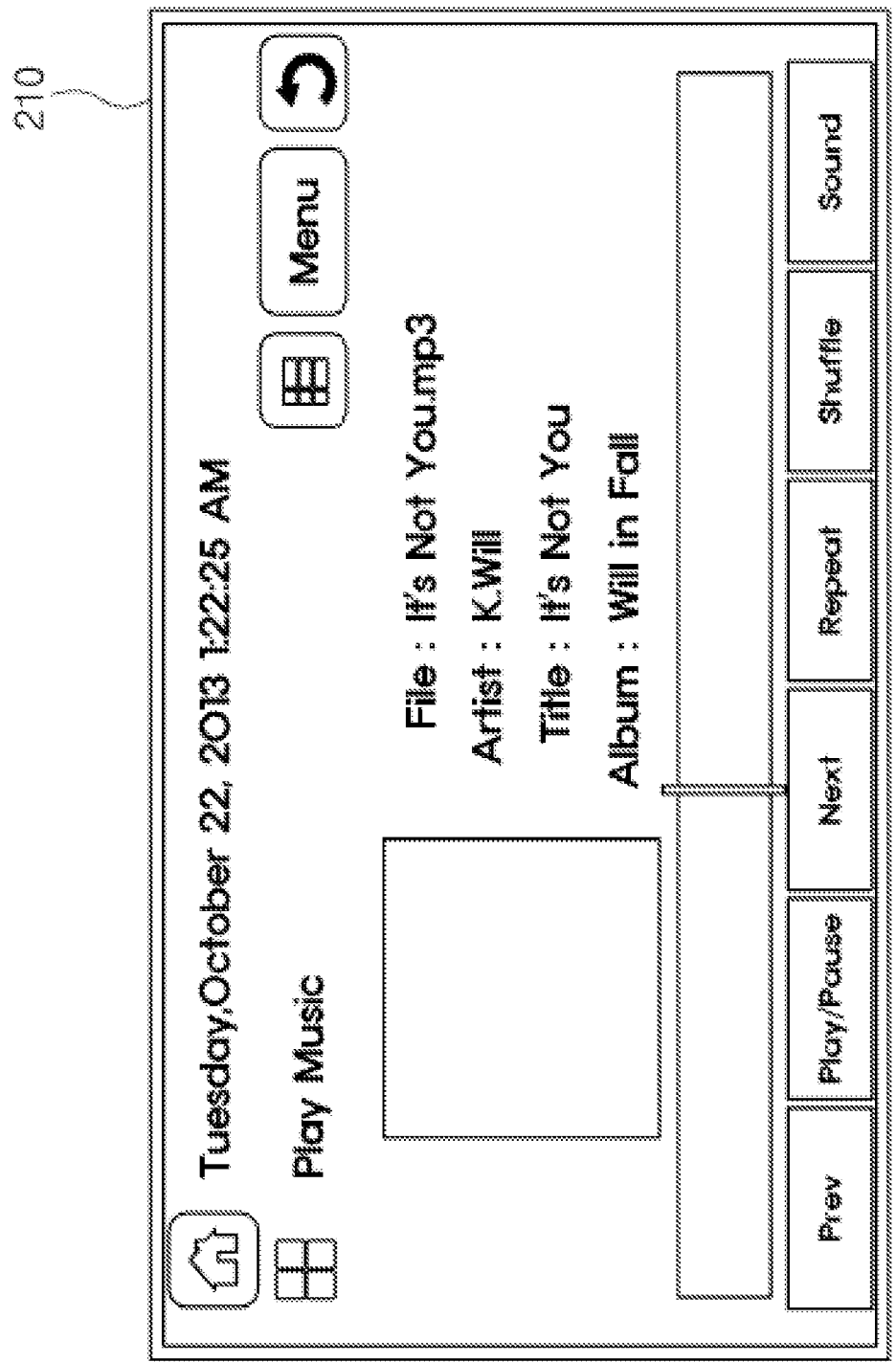

Alternatively, if the matching ratio between the recognized gesture and the reference gesture in (b) of FIG. 9 is determined to be the highest ratio, the AVN device displays the information about 'It's not you' a next song and outputs 'It's not you' by the sound unit, as illustrated in FIG. 10c.

FIG. 11 is a control flow chart illustrating a terminal 100 according to another embodiment.

In one embodiment, Audio Video Navigation device (AVN) provided in the vehicle will be described an example of a terminal.

An input unit and an output unit of Audio Video Navigation (AVN) device may be integrally embedded in a dashboard or separately installed on a different location.

In a case when the input unit 110 and the output unit, 130 of the AVN device are separately installed, the input unit 110 may be provided on an arm rest, and the output unit 130 may be provided on a dashboard.

The AVN device determines whether a signal to start the operation is input to the input unit 110 while maintaining a standby state in which the output unit 130 is deactivated and the input unit 110 is activated.

The signal to start the operation may be a touch signal, which is making contact with the input unit 110 of the pad 111, or turning on a start operation button.

When the signal to start the operation is input, the AVN device displays a main image on the display unit 131. The main image may be an image for displaying an icon representing each of a plurality of functions performed by the AVN device.

The AVN device determines whether the user makes contact with the pad to input operation commands, at Step 211.

If the object is determined to make contact with the surface of the pad 111, the AVN device determines that a point in time when the object is determined to make contact with the surface of the pad 111, is a start time to input an operation command, and the AVN device verifies a position of a touch point where the object makes contact with.

The AVN device determines whether the object is separated from the pad 111 after the object is in contact with the pad 111, and verifies a position of the object which is moved in a state of being spaced apart from the pad 111 from when the object is separated from the pad, at Step 212.

The AVN devices determines whether the object is detected while verifying the position of the object, at Step 213, there by determining an end time of inputting the operation command.

The end time of inputting the operation command is that a point time when a gesture as desired by the user is completed.

The AVN device connects the position of the object is detected from the start time of inputting the operation command to the end time of inputting the operation command.

That is, the AVN device generates an orbit by connecting the position of the object while being moved from the position of the touch point touched at the start time of inputting the operation command with the course of time, at Step 214, and recognizes the user's gesture corresponding to the generated orbit of the object, at Step 215.

The position of the object includes a distance of the object spaced apart from the pad 111 and a moving direction and path of the object. Therefore, the AVN device may recognize which direction the object is moved in while having a distance to the pad 111.

The ANC device compares a plurality of reference gestures, which is pre-stored, with each of the gesture recognized, verifies a matching ratio each of the gesture, determines the reference gesture having the highest matching ratio in the verified matching ratio, determines an operation command corresponding to the determined reference gesture, at Step 216, generates a control signal corresponding to the determined operation command and drives a load by outputting the control signal to the load, at Step 217.

Herein, the load may include at least one of the display unit 131 or the sound 132. As mentioned above, they will be described with reference to FIGS. 12 to 20. As illustrated in FIG. 12, at the AVN device, operation commands corresponding to reference gestures performed in a certain range are stored.

Figure 12A:
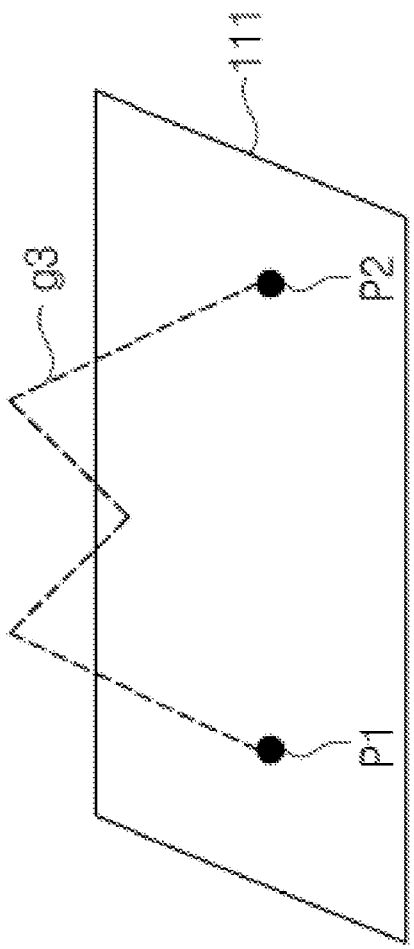

It is assumed that, as illustrated in FIG. 12A, an operation command corresponding to a gesture of a shape of M (g3) forming between a first touch point (p1) touched on the pad 111 and a second touch point (p2) is displaying a menu. As illustrated in FIG. 12B, an operation command corresponding to a gesture of a shape of a heart (g4) forming between a first touch point (p1) touched on the pad 111 and a second touch point (p2) is performing a phone-call function. As illustrated in FIG. 12C, an operation command corresponding to a gesture of a shape of a star (g5) forming between a first touch point (p1) touched on the pad 111 and a second touch point (p2) is performing a navigation function. As illustrated in FIG. 12C, an operation command corresponding to a gesture of a shape of a number three (g6) forming between a first touch point (p1) touched on the pad 111 and a second touch point (p2) is performing a three-dimensional displaying function.

Figure 13:
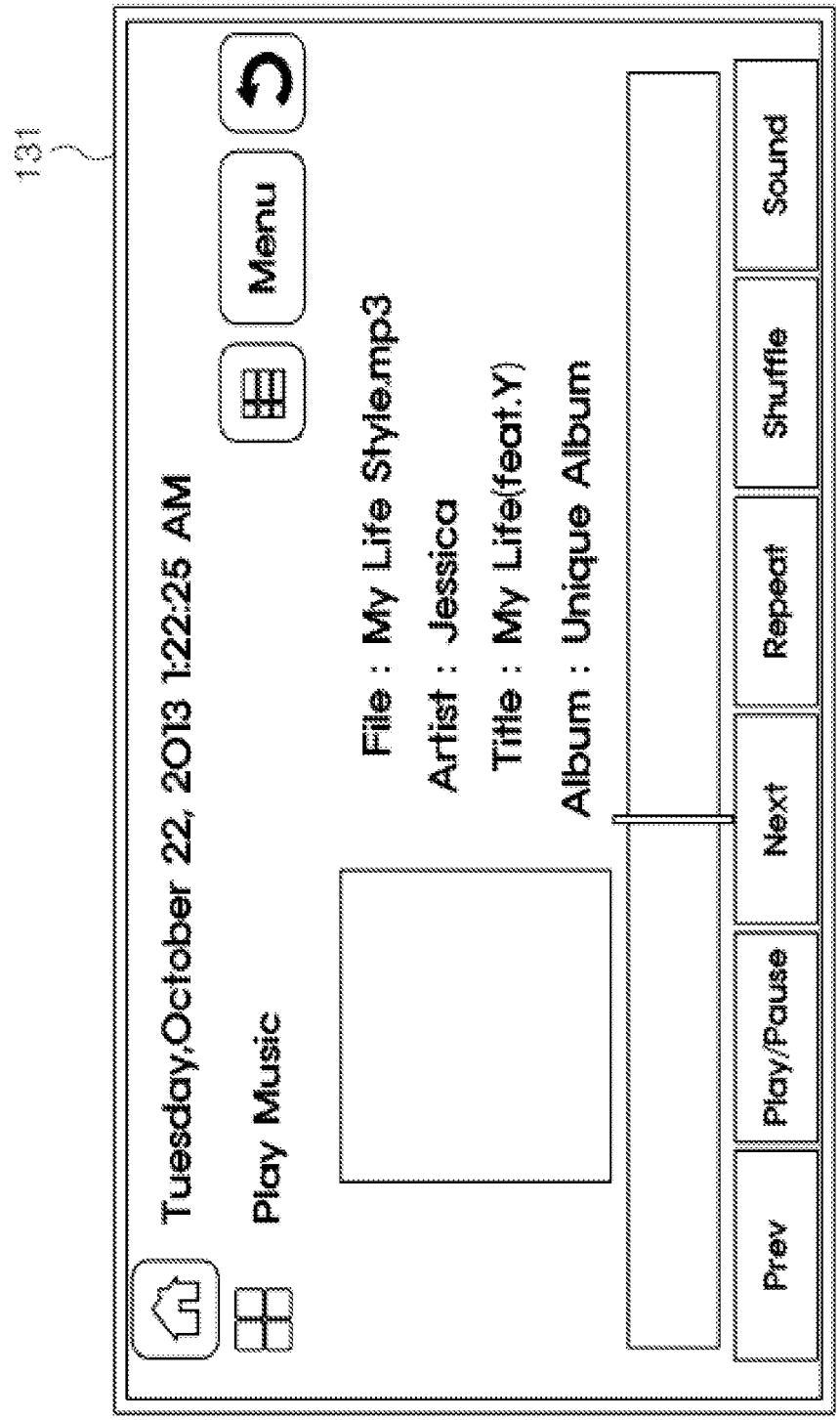
FIGS. 13-17 illustrate various displays on a display screen of a display unit of the terminal to show various operations of an output unit corresponding to gestures recognized by the terminal according to another embodiment.

As illustrated in FIG. 13, in a state of performing the audio playback function, the AVN device 100 displays information about the music currently playing and information about setting audio function by the display unit 131.

While displaying information about the music currently playing "My life", The AVN device 100 outputs the music by the sound unit and determines whether the touch event occurs on the pad 111 of the input unit 110.

If the pad 111 of the input unit 110 is determined to be touched by the object or the user's hand, the AVN device verifies a position of a first touch point being touched, and verifies the position of the object, which is changed from the position of the touch point verified until the object is re-touched to the pad.

In addition, if the pad 111 is not touched for a certain time after the objected is moved in the space, the gesture for inputting the operation command is determined to be cancelled.

The AVN device verifies the position of the object detected between a first touch point in contact with the object at first, and a second touch in contact with the object again, generates an orbit by connecting the position of the object changed between the position of the first touch point and the position of the second touch point, with the course of time, and recognizes a gesture corresponding to the generated orbit of the object.

The AVN device determines the gesture having the highest matching ratio by device comparing reference gestures, which is pre-stored, with each of the recognized gesture.

Figure 14:
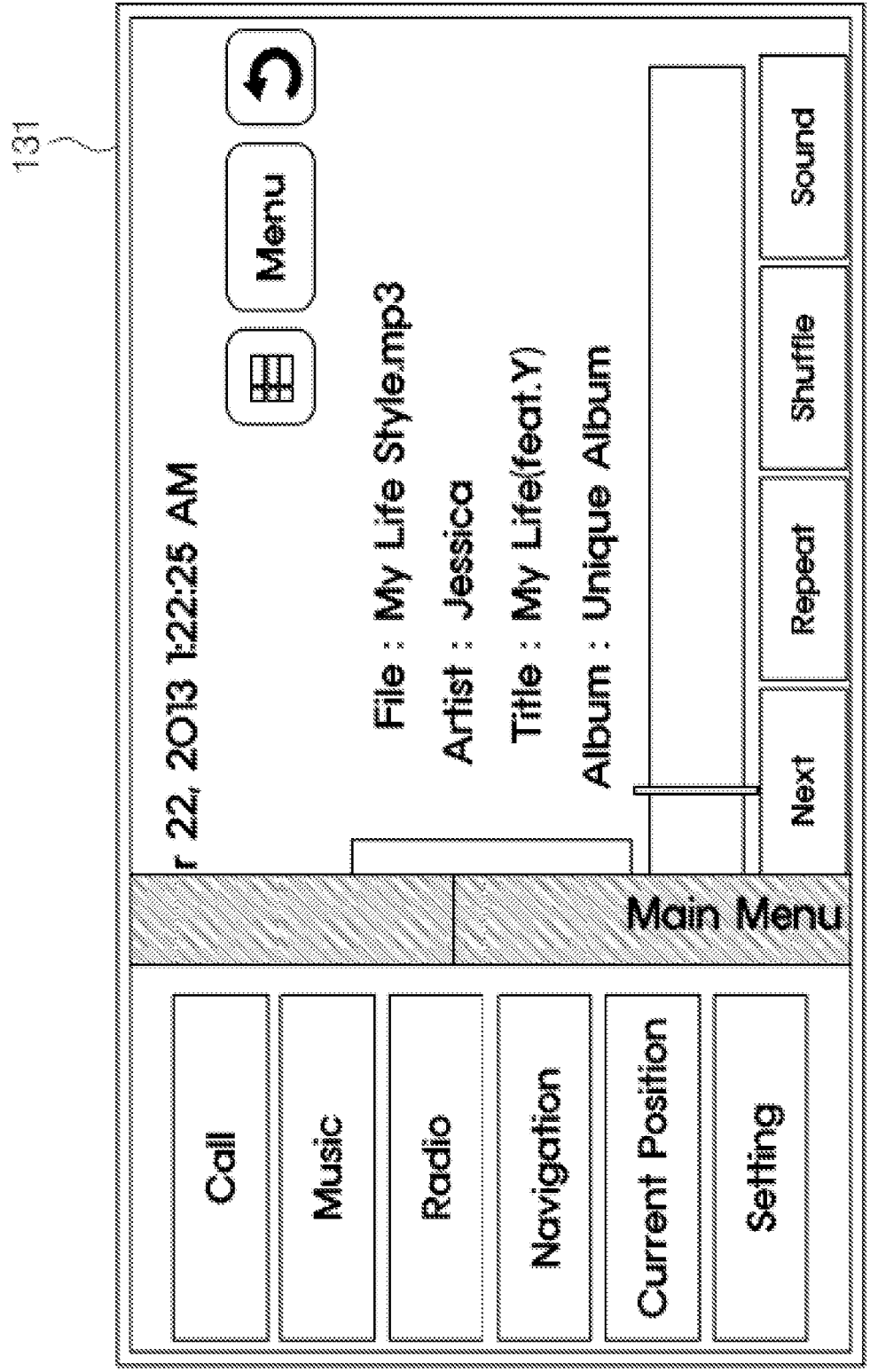

If the matching ratio between the recognized gesture and the reference gesture in FIG. 12A is determined to be the highest ratio, the AVN device displays the menu screen to be overlapped on the execution screen of playing the music on the display unit, as illustrated in FIG. 14. At this time, the music may be continuously played.

In addition, the screen of the display unit 131 may be displayed after converted to the menu screen. At this time, playing the music may be stopped.

Figure 15:
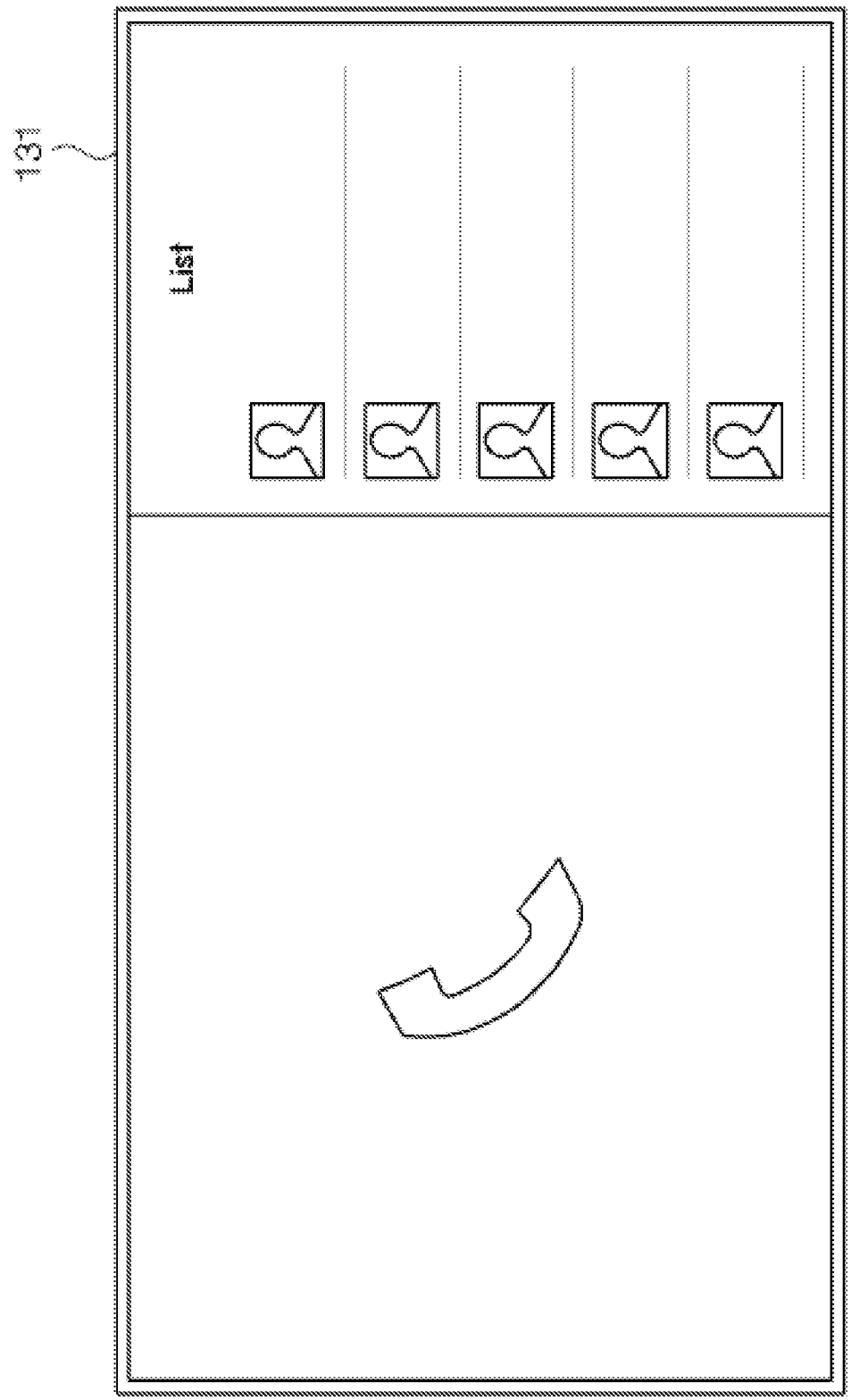

If the matching ratio between the recognized gesture and the reference gesture in FIG. 12B is determined to be the highest ratio, the AVN device displays an image related to phone-calling on the display unit, as illustrated in FIG. 15. In addition, the AVN device may be selected a phone number on the list of the address book displayed on the display unit by using the gesture.

Figure 16:
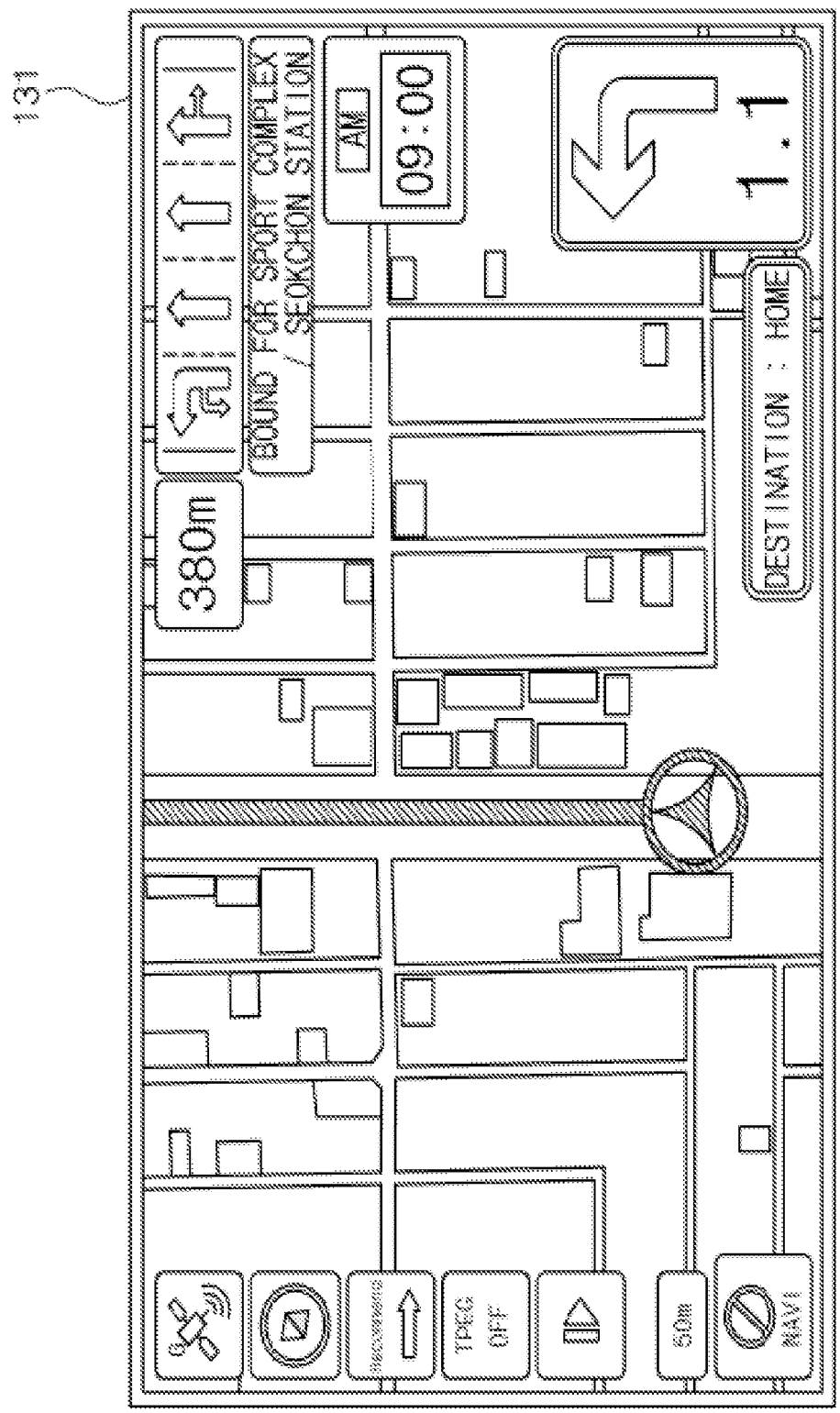
Figure 17:
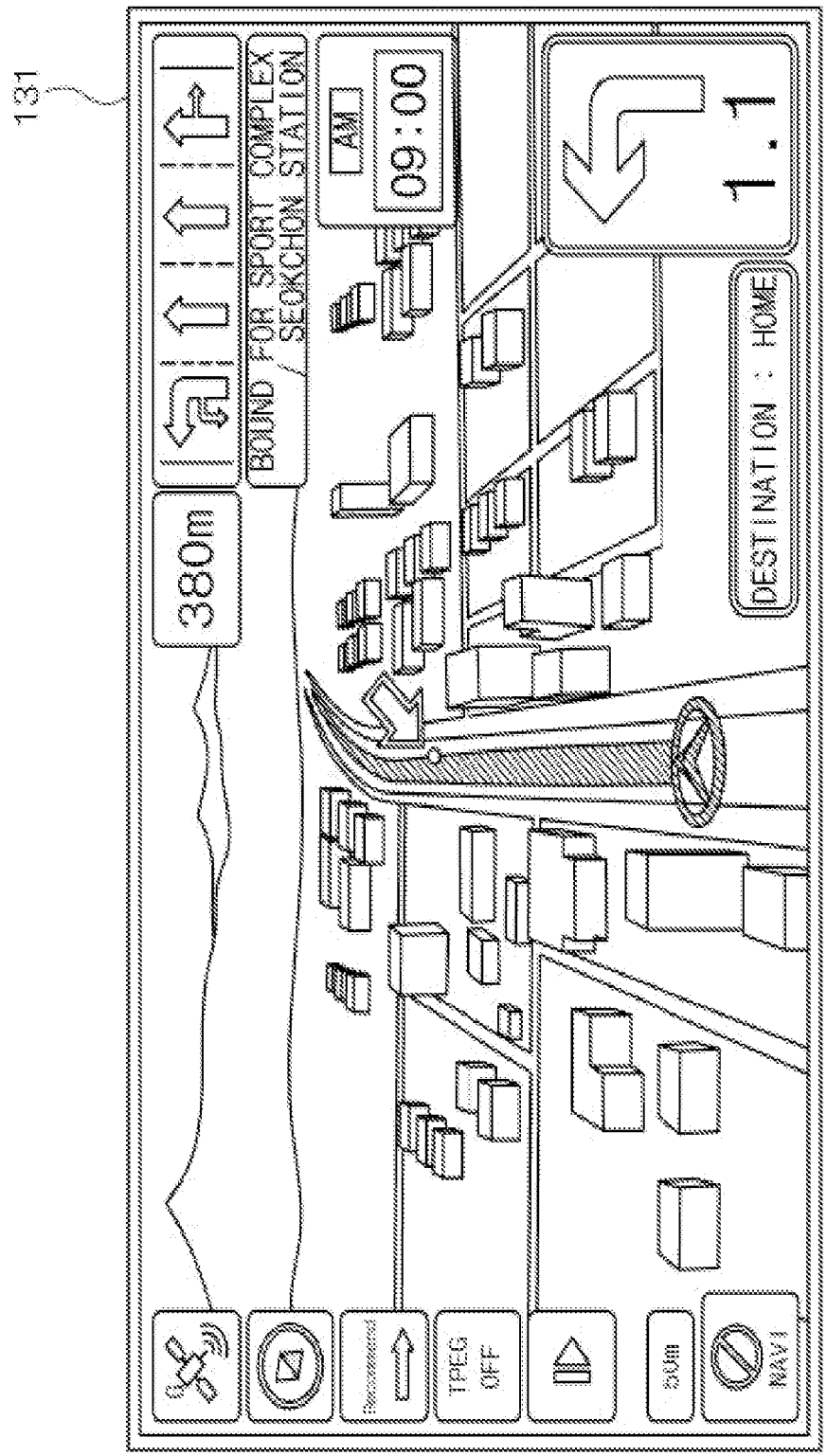

If the matching ratio between the recognized gesture and the reference gesture in FIG. 12C is determined to be the highest ratio, the AVN device performs the navigation function and displays an image related to the navigation, as illustrated in FIG. 16.

The AVN device determines whether another operation command is input by the user while displaying the image related to the navigation in two-dimension. That is, while displaying two-dimensionally the image related to the navigation, the AVN device determines whether the gesture is input on the pad 111, and displays the three-dimensional navigation image by converting the two-dimensional navigation image displayed on the display unit 131 when the recognized gesture is determined to be the reference gesture in FIG. 12D.

Figure 18:
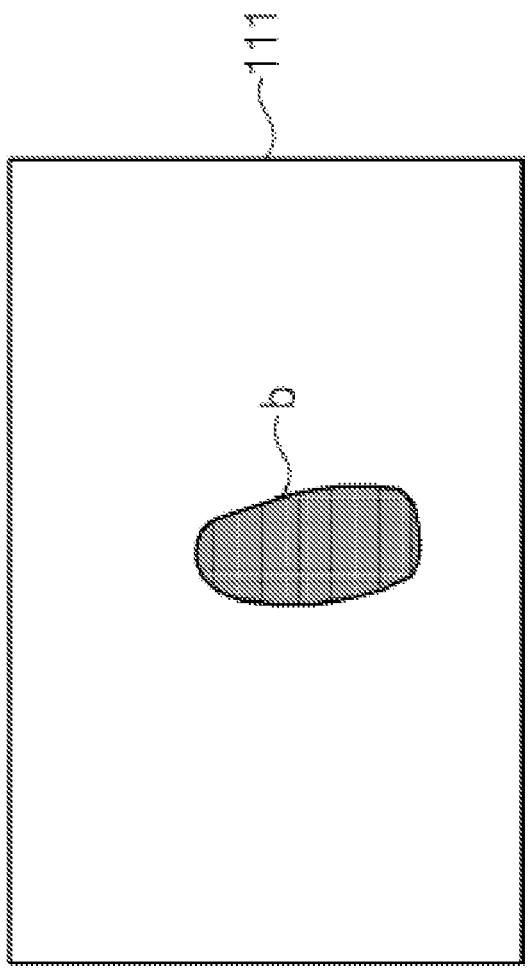
FIG. 18 is illustrates a display of an exemplary recognized object in contact with the terminal according to another embodiment.

As illustrated in FIG. 18, when verifying the position of the object, the AVN device recognizes blob (b) of the object touched on the pad of the input unit, and verifies the position of the object while tracking the recognized blob of the object.

Thus, the input information method by using gestures may be utilized as a hot key function for executing menus, telephone, navigation, radio, audio, and pictures. Herein, the hot key function represents a function of calling immediately a function desired by the user regardless of the function which is the terminal performs.

If the AVN device determines that the object is maintained to have a certain distance to the pad 111, the AVN device determines that a gesture is using a shape thereof not a gesture of the object moved consecutively, and recognizes the gesture corresponding to the shape of the object.

In addition, the gesture may have the shape of the object, and information of the distance between portions of the object and the pad 111. As mentioned above, they will be described with reference to FIGS. 19 and 20. At the AVN device, an operation command corresponding to reference gestures performed in a certain range are stored.

Figure 19A:
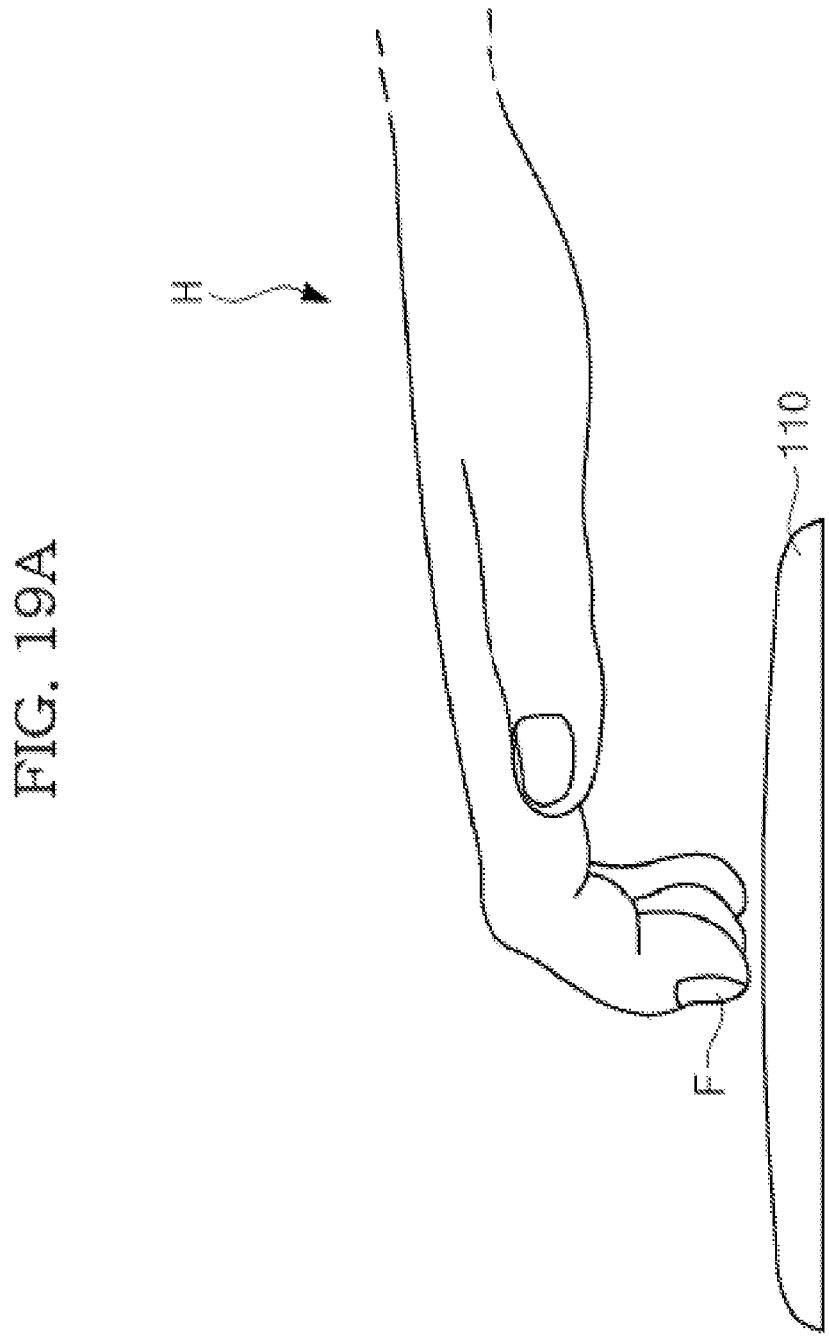
FIGS. 19a and 19b illustrate examples of gestures recognized by the terminal according to another embodiment.
Figure 19B:
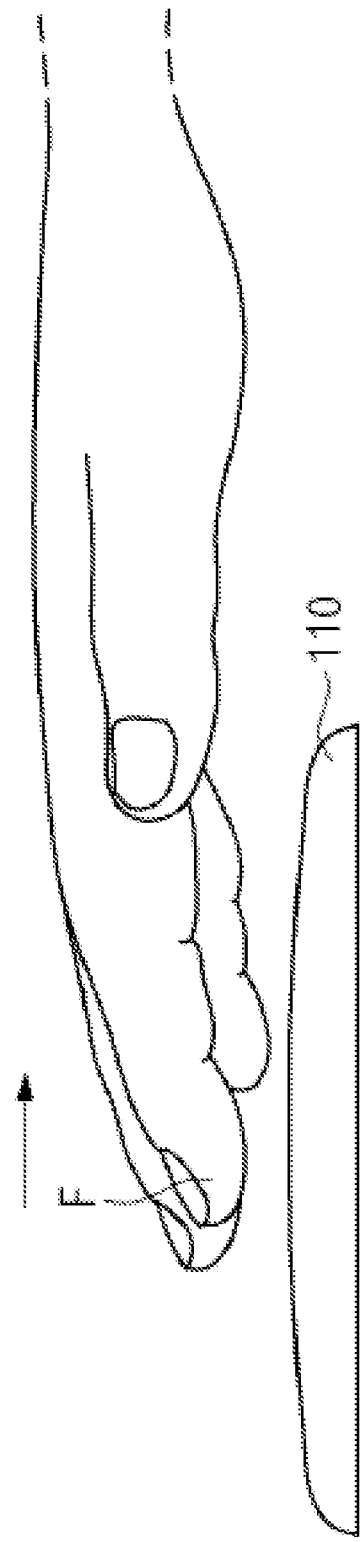

As illustrated in FIG. 19A, an operation command corresponding to a gesture of a shape of a hand forming between a first touch point (p1) touched on the pad 111 and a second touch point (p2) is displayed as a three-dimension command. As illustrated in FIG. 19B, an operation command corresponding to a gesture of a shape of a hand forming between a first touch point (p1) touched on the pad 111 and a second touch point (p2) is displayed as a two-dimension command.

While displaying an image related to navigation in two-dimensional, the AVN device determines whether another operation cot and is input by the user.

That is, the AVN device determines whether the pad 111 is touched by the object of the input unit 110, verifies the position of the object when the object is in contact with the pad 111, and recognizes a shape of the object which is spaced apart from the pad 111 if the position of the object is not changed with the course of time.

The AVN device recognizes a distance between portions of the object where is detected.

Particularly, as illustrated in FIGS. 19A-19B, the AVN device may calculate a distance between the end portion of the finger (F) touched to the pad 111 and the finger joint (J). The distance between the end portion of the finger (F) and the finger joint (J), may be changed depending on the degree of bending of the finger (F). Therefore, the distance is shortened as the finger is more bent.

Therefore, the AVN may calculate the distance between the finger (F) and an input unit 110, and may calculate an angle of the finger (F) based on the distance between the end portion of the finger (F) and the finger joint (J), hand the distance the finger (F) and an input unit 110.

Figure 20A:
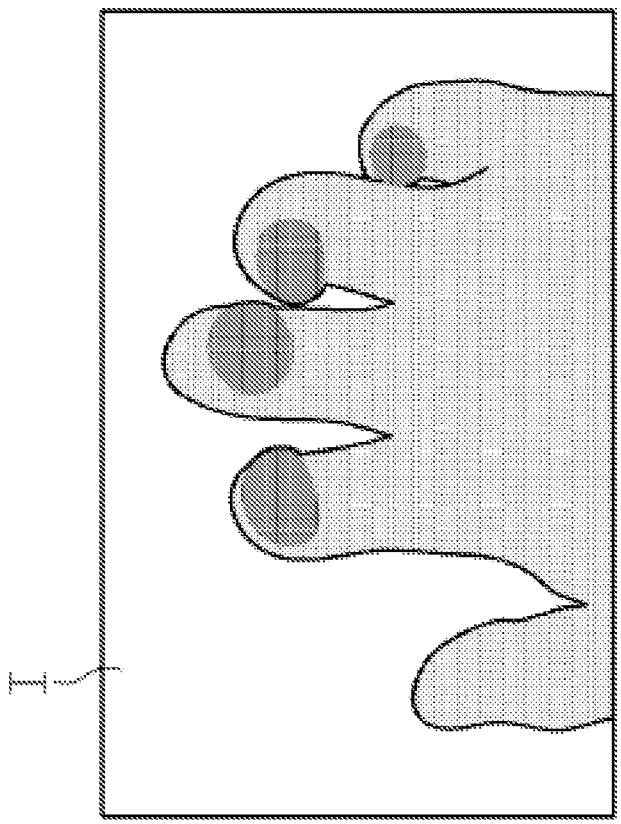
FIGS. 20a and 20b illustrate examples of gestures recognized by the terminal according to another.

Generating an image of the gesture (I) may be realized based on the position of the object and the distance to the pad. When a shape, such as in FIG. 20A is determined to be recognized, the AVN device determines that the shape, such as in FIG. 20A, is the reference gesture in FIG. 19A, display a three-dimensional navigation image by converting a two-dimensional navigation image displayed on the display unit 131.

While displaying an image three-dimensionally related to navigation, the AVN device determines whether the pad 111 of the input unit 110 is touched by the object, verifies the position of the object when the pad 111 is touched by the object, and recognizes the shape of the object spaced apart from the pad when the position of the object is not changed with the course of time.

Figure 20B:
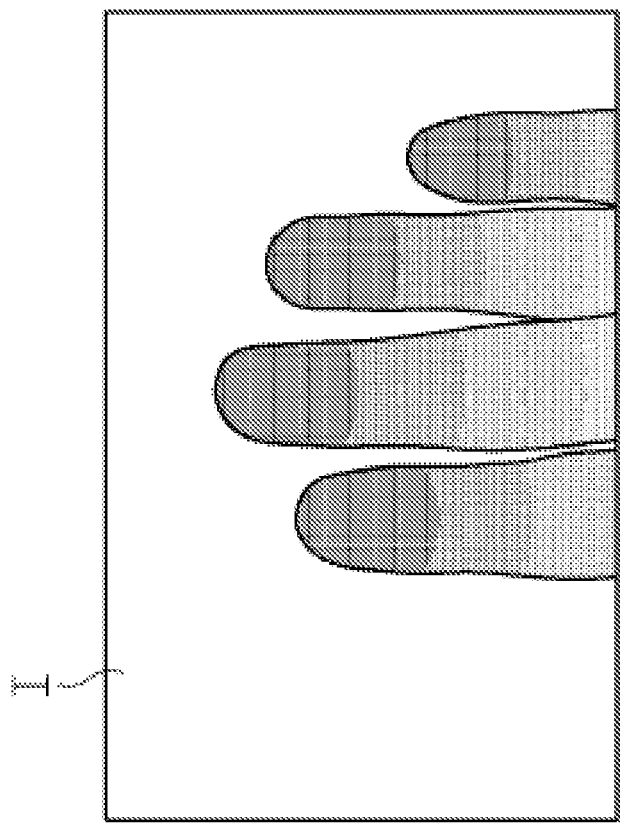

The AVN device recognizes a distance between portions of the object where is detected. When a shape, such as in FIG. 20B is determined to be recognized, the AVN device determines that the shape, such as in FIG. 20B, is the reference gesture in FIG. 19B, display a two-dimensional navigation image by converting a three-dimensional navigation image displayed on the display unit 131.

The AVN device may store operation commands corresponding to the number of finger spreading out. In addition, the terminal 100 may control various equipment for convenience provided in the vehicle 1 besides the AVN device. For example, it is also possible to raise/reduce the temperature of the air conditioner provided in the vehicle and to change the volume and channels of the radio. The terminal 100 mounted to the vehicle 1 may also be used to control the position and the angle of the seat.

By controlling the vehicle using the terminal in this way, the convenience and the user experience may be improved. It is possible to improve the accuracy of the operation by providing visual and tactile feedback to the user. By performing a hot key function as a simple manipulation method, there may be no need of a plurality of hard keys so that the space-saving effect may be obtained, and the operation command may be stably input while driving. The start point, that is, the first touch point and the end point, that is, the second touch point are fixed to the surface of the pad 111 to secure the recognition rate besides a series of processes for finding the start point and rotation of the gesture.

FIG. 21 is a control block diagram illustrating a terminal according to another embodiment, and the terminal as a control device 300 includes an input unit 310 and a controller 320. The input unit 310 is configured to receive an operation command from the user. The input unit 310 includes a pad 311 forming an external appearance thereof and which objects is in contact with or close to, and a detection unit 312 disposed on a lower portion of the pad 311 and configured to detect a position of the object adjacent to the pad 311. The object may include a manipulation body, such as the users' hand, and a touch pen.

The position of the object may be verified based on a position and a size of a detection signal output from the detection unit 312.

The position of the object may include information about distance and direction. As such, the position of the object may be the position in space of a certain range with respect to pad 311 and may be represented by X, Y, and Z The detection unit 112 may include a proximity sensor, and the proximity sensor may include any one sensor of a capacitance sensor, an ultrasonic sensor or an optical sensor.

The detection unit 312 may be provided in a way that a plurality of proximity sensors is two-dimensionally arranged, and the controller 320 may recognize the position of the object in three-dimensional space based on the size of the output signals output from the plurality of the proximity sensors.

The input unit 310 may further include a touch unit (not shown) configured to detect a pressure or a depression applied to the pad 311. As such, the input unit 310 may determine whether the object makes contact with by the touch unit of the input unit 310.

For example, a plurality of electrodes is arranged in the X-axis direction in a first panel of the detection unit 312, and a plurality of electrodes is arranged in the Y-axis direction in a second panel of the detection unit 312. That is, electrodes in the first and second panel of the detection unit are divided in the form of a matrix, and the electrodes are configured to recognize coordinates by using each line of the Y axis and X axis.

An electric field between the electrodes may be changed when objects or body is adjacent, and electrostatic capacitances may be changed according to the change of the electric field.

The controller 320 is configured to recognize the gesture based on the output signal of the detection unit 312, and determines the operation command from the user corresponding to the recognized gesture. As shown in FIG. 21, the controller 320 includes a recognition unit 321 configured to recognize the user's gesture on the basis of the output signal of the detection unit 312, and a control signal generator 322 configured to determine an operation command corresponding to the recognized gesture, and generate a control signal in response to the determined operation command.

In one exemplary embodiment, the controller 320 may be provided on the input unit 310, and may be separately provided on the outside of the input unit 310.

The controller 320 verifies the position of the object based on the capacitance change that changed as the object approaches, verifies the change in the position of the object corresponding to the lapse of time.

When the object is determined to be maintained a certain distance to the pad 311 during a certain time, the controller 320 determines the gesture using a shape not the gesture which object moves continuously, and recognizes the gesture corresponding to the shape of the object.

Herein, determining the certain distance includes determining whether the change in the distance between the object and the pad 311 is within a certain range.

When recognizing the gesture using by the shape of the object, the controller 320 may calculate the object adjacent to the input unit 310, such as, the user's hand and the position of the finger, a distance to the input unit 310, an area and the like based on the output signal. The recognition unit 321 of the controller 320 determines whether the object is in contact, verifies Blob of the object when the object is in contact with the pad 311, and verifies the position of the object by tracking the blob, which is verified when the object is separated from the pad.

When the object is in contact with the pad, the recognition unit 321 verifies the position of the object, which is changed from when the object is separated from the pad 311, and recognizes the gesture corresponding to the verified change in the position of the object.

Herein, the position of the object, which is changed, represents n orbit of the object in a state where the object is spaced from the pad 311.

The recognition unit 321 recognizes the gesture by tracking the position of the object from when the object is spaced from the pad 311 until when the object is not detected.

Herein, a point in time when the object is not detected may be defined as at the time that the detection signal is not generated according to the detection of the object on the detection unit or at the time that the size of the detection signal, which s detected from the detection unit, is less than a certain signal.

The recognition unit 321 may recognize the gesture by tracking the position of the object from when the object is spaced from the pad until when the object is re-touched the pad.

The controller 320 outputs the control signal corresponding to the operation command as an external device connected through a wired or wireless. Herein, the control signal may be output via wired or wireless communication.

As is apparent from the above description, accordingly the proposed terminal may allow an operation command desired by the user to be completed since a gesture is initiated at the surface of the terminal, and terminated at the surface of the terminal again after being performed in a space on the surface of the terminal.

By specifying the start or the end of the gesture, the intention of the user may be clearly presented and may improve the recognition rate.

Therefore, the user may easily manipulate mobile phones and various equipments while driving.

By tracking not only a touch in contact with the surface of the terminal, but a finger in a space spaced apart from the surface, the inconvenience of the limited manipulation, which is about limited operation of two-dimensional gesture that is bound to the surface of the terminal, may be eliminated. Therefore, the problem of the ambiguity of the start and the end of the gesture in three-dimensional space may be solved.

In addition, not limited to manipulating in two dimensions in cooperation graphical user interface (GUI), manipulating in the space may be realized so as to constitute abundant user interface (UI).

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A terminal comprising:
an input device provided in a pad;
at least one sensor installed adjacent to the pad, and configured to detect an object;
a controller configured to:
receive one or more signals of detection of the object from the at least one sensor,
determine whether the object makes contact with the pad,
identify one or more positions of the object that is near to the pad and is not in contact with the pad based on the one or more signals,
recognize a gesture of the object by tracking the one or more positions of the object starting from a point of time at which the object having been in contact with the pad is near to the pad and is not in contact with the pad, until a point of time at which the object is not detected by the at least one sensor,
determine an operation command corresponding to the recognized gesture, and
generate a control signal corresponding to the determined operation command; and
an output device provided in a display or a speaker and configured to:
receive the control signal transferred from the controller, and
perform an operation based on the determined operation command,
wherein, when recognizing the gesture of the object, the controller identifies a change in moving direction of the object and a change in distance between the pad and the object based on the one or more positions of the tracked object in space of a certain range, and recognizes the gesture of the object corresponding to the identified change in moving direction of the object and the identified change in distance between the pad and the object,
wherein the object includes fingers of a hand, and
wherein, when a distance between the pad and the hand is maintained during a predetermined period of time, the controller determines a first distance between an end portion of each of the fingers and the pad and a second distance between a joint of each of the fingers and the pad based on the one or more signals, obtains a degree of bending of each of the fingers based on the first distance and the second distance, and recognizes a gesture corresponding to a shape of the hand based on the degree of bending of each of the fingers.

2. The terminal of claim 1, wherein the at least one sensor comprises at least one of a capacitance sensor, an ultrasonic sensor, or an optical sensor.

3. The terminal of claim 1, wherein the controller determines a matching ratio by comparing the recognized gesture with pre-stored reference gestures, and determines an operation command corresponding to one of the pre-stored reference gestures having a highest matching ratio with the recognized gesture.

4. A terminal comprising:
an input device provided in a pad;
at least one sensor installed adjacent to the pad, and configured to detect an object; and
a controller configured to:
receive one or more signals of detection of the object from the at least one sensor;
determine whether the object makes contact with the pad,
identify one or more positions of the object that is near to the pad and is not in contact with the pad based on the one or more signals,
recognize a gesture of the object by tracking the one or more positions of the object starting from a point of time at which the object having been in contact with the pad is near to the pad and is not in contact with the pad, until a point of time at which the object makes contact with the pad again,
determine an operation command corresponding to the recognized gesture,
generate a control signal corresponding to the determined operation command, and
an output device provided in a display or a speaker and configured to:
receive the control signal transferred from the controller, and
perform an operation based on the determined operation command,
wherein, when recognizing the gesture of the object, the controller identifies a change in moving direction of the object and a change in distance between the pad and the object based on the one or more positions of the tracked object in space of a certain range, and recognizes the gesture of the object corresponding to the identified change in moving direction of the object and the identified change in distance between the pad and the object,
wherein the object includes fingers of a hand, and
wherein, when a distance between the pad and the hand is maintained during a predetermined period of time from when the object is separated from a surface of the pad, the controller determines a first distance between an end portion of each of the fingers and the pad and a second distance between a joint of each of the fingers and the pad based on the one or more signals, obtains a degree of bending of each of the fingers based on the first distance and the second distance, and recognizes a gesture corresponding to a shape of the hand based on the degree of bending of each of the fingers.

5. The terminal of claim 4, wherein the at least one sensor includes at least one of a capacitance sensor, an ultrasonic sensor, or an optical sensor.

6. The terminal of claim 4, wherein the controller determines matching ratios by comparing the recognized gesture with pre-stored reference gestures, and determines an operation command corresponding to one of the pre-stored reference gestures having a highest matching ratio with the recognized gesture.

7. A control method of a terminal comprising:
detecting, by at least one sensor, an object;
determining, by a controller, whether the object makes contact with an input device provided in a pad based on one or more signals of detection of the object from the at least one sensor;
determining, by the controller, whether the object is not in contact with the pad based on the one or more signals after determining that the object made contact with the pad;
detecting, by the at least one sensor, one or more positions of the object is near to the pad and is not in contact with the pad based on the one or more signals;
recognizing, by the controller, a gesture of the object by tracking the one or more positions of the object starting from a point of time at which the object having been in contact with the pad is near to the pad and is not in contact with the pad, until a point of time at which the object is not detected by the at least one sensor;
determining, by the controller, an operation command corresponding to the recognized gesture;
generating, by the controller, a control signal corresponding to the determined operation command; and
receiving, by an output device provided in a display or a speaker, the control signal transferred from the controller and performing an operation based on the determined operation command,
wherein, when recognizing the gesture of the object, the controller identifies a change in moving direction of the object and a change in distance between the pad and the object based on the one or more positions of the tracked object in space of a certain range, and recognizes the gesture of the object corresponding to the identified change in moving direction of the object and the identified change in distance between the pad and the object,
wherein the object includes fingers of a hand, and
wherein the control method further comprises:
determining whether a distance between a surface of the pad and the hand is maintained during a predetermined period of time from a time point at which the hand is separated from the surface of the pad;
determining a first distance between an end portion of each of the fingers and the pad and a second distance between a joint of each of the fingers and the pad based on the one or more signals;
obtaining a degree of bending of each of the fingers based on the first distance and the second distance; and
recognizing a gesture corresponding to a shape of the hand based on the degree of bending of each of the fingers.

8. The control method of claim 7, wherein the recognizing a gesture of the object comprises:
generating an orbit of the object by connecting the one or more positions of the object, which is tracked, with the course of time; and
recognizing the gesture corresponding to the generated orbit.

9. The control method of claim 7, wherein the tracking the one or more positions of the object comprises determining continuously the one or more positions of an object based on a position and a size of a detection signal output from the pad.

10. The control method of claim 9, wherein the detection signal is a capacitance signal, an ultrasonic signal or an optical signal.

11. The control method of claim 7, further comprising:
  determining matching ratios by comparing the recognized gesture with pre-stored reference gestures; and
  determining an operation command corresponding to one of the pre-stored reference gestures having a highest matching ratio among the matching ratios are verified.

12. A vehicle including a terminal for performing a navigation function, an audio function, and a video function, the terminal comprising:
  an input device provided in a pad;
  at least one sensor installed adjacent to the pad, and configured to detect an object;
  a controller configured to:
    receive one or more signals of detection of the object from the at least one sensor,
    determine whether the object makes contact with the pad, and identify one or more positions of the object that is near to the pad and is not in contact with the pad based on the one or more signals,
    recognize a gesture of the object by tracking the one or more positions of the object starting from a point of time at which the object having been in contact with the pad is near to the pad and is not in contact with the pad, until a point of time at which the object is not detected by the at least one sensor,
    determine an operation command corresponding to the recognized gesture, and
    generate a control signal corresponding to the determined operation command, and
  an output device provided in a display or a speaker and configured to:
    receive the control signal transferred from the controller, and
    perform an operation based on the determined operation command,
  wherein, when recognizing the gesture of the object, the controller identifies a change in moving direction of the object and a change in distance between the pad and the object based on the one or more positions of the tracked object in space of a certain range, and recognizes the gesture of the object corresponding to the identified change in moving direction of the object and the identified change in distance between the pad and the object,
  wherein the object includes fingers of a hand, and
  wherein, when a distance between a surface of the pad and the hand is maintained during a predetermined period of time, the controller determines a first distance between an end portion of each of the fingers and the pad and a second distance between a joint of each of the fingers and the pad based on the one or more signals, obtains a degree of bending of each of the fingers based on the first distance and the second distance, and recognizes a gesture corresponding to a shape of the hand based on the degree of bending of each of the fingers.

13. The vehicle of claim 12, wherein the input device and the output device are detachably mounted.

14. The vehicle of claim 12, wherein the operation command of the vehicle comprises an operation command of an air conditioner, a seat, a heater, a radio, or a wiper.

15. The vehicle of claim 12, wherein the controller vehicle determines a matching ratio by comparing the recognized gesture with pre-stored reference gestures, and determines an operation command corresponding to one of the pre-stored reference gestures having a highest matching ratio with the recognized gesture.

* * * * *